US010136330B2

United States Patent
Sethi et al.

(10) Patent No.: US 10,136,330 B2
(45) Date of Patent: Nov. 20, 2018

(54) STAGGERED CHANNEL CHANGING FOR CELLS OF SPECTRUM SHARING NETWORKS

(71) Applicant: QUALCOMM Incorporated, San Diego, CA (US)

(72) Inventors: Puneet Sethi, San Diego, CA (US); Farhad Meshkati, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/232,474

(22) Filed: Aug. 9, 2016

(65) Prior Publication Data

US 2018/0049036 A1 Feb. 15, 2018

(51) Int. Cl.
*H04W 36/00* (2009.01)
*H04W 16/14* (2009.01)
*H04W 72/04* (2009.01)
*H04W 92/04* (2009.01)

(52) U.S. Cl.
CPC ....... *H04W 16/14* (2013.01); *H04W 36/0055* (2013.01); *H04W 72/0453* (2013.01); *H04W 92/04* (2013.01)

(58) Field of Classification Search
None
See application file for complete search history.

(56) References Cited

U.S. PATENT DOCUMENTS 8,948,038 B1 2/2015 Trott et al.
2010/0304678 A1* 12/2010 Chandra ............... H04W 16/14
455/62
2013/0039171 A1 2/2013 Gaal et al.
(Continued)

FOREIGN PATENT DOCUMENTS

WO WO-2015017463 A2 2/2015
WO WO-2015057811 A2 4/2015

OTHER PUBLICATIONS

Mitola III J., et al., "Accelerating 5G QoE via Public-Private Spectrum Sharing," IEEE Communications Magazine, May 2014, pp. 77-85.
(Continued)

*Primary Examiner* — German Viana Di Prisco
(74) *Attorney, Agent, or Firm* — Holland & Hart LLP

(57) ABSTRACT

Described features are directed to staggered frequency channel changing for cells of spectrum sharing networks. In some examples users communicating on one or more frequency channels of a spectrum sharing network may receive an indication that those channels are to be vacated, for example that the frequency channels are not to be transmitted on, or otherwise used for communications. Cells of the spectrum sharing network may receive the indication and perform staggered (e.g., sequential or randomly-timed) channel changes. The staggered channel changes may facilitate handover of user devices of the spectrum sharing network by, for example, reducing a number of cells that are simultaneously undergoing a channel change procedure. Thus, staggered frequency channel changing may reduce user service interruptions and radio link failures in a spectrum sharing network.

28 Claims, 18 Drawing Sheets

(56) References Cited

U.S. PATENT DOCUMENTS

| | | | |
|---|---|---|---|
| 2014/0162666 A1* | 6/2014 | Ratasuk | H04W 72/0486 |
| | | | 455/450 |
| 2014/0321425 A1 | 10/2014 | Mueck et al. | |
| 2015/0304852 A1* | 10/2015 | El-Refaey | H04W 16/14 |
| | | | 455/509 |
| 2015/0304853 A1 | 10/2015 | Murray et al. | |
| 2015/0319621 A1* | 11/2015 | Markwart | H04W 16/14 |
| | | | 455/454 |
| 2015/0358968 A1 | 12/2015 | Malladi et al. | |
| 2016/0127912 A1* | 5/2016 | Markwart | H04W 16/14 |
| | | | 455/447 |

OTHER PUBLICATIONS

ISA/EP, International Search Report and Written Opinion of the International Searching Authority, Int'l Application No. PCT/US2017/039267, dated Oct. 12, 2017, European Patent Office, Rijswijk, NL, 14 pgs.

* cited by examiner

STAGGERED CHANNEL CHANGING FOR CELLS OF SPECTRUM SHARING NETWORKS

BACKGROUND

Field of the Disclosure

The present disclosure, for example, relates to wireless communication systems, and more particularly to staggered frequency channel changing for cells of spectrum sharing networks.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A spectrum sharing network may include cells with overlapping coverage areas, where the cells may operate using one or more frequency channels of an initial channel set. User devices may communicate with cells of the spectrum sharing network on frequency channels of the initial channel set. Some spectrum sharing networks, such as those operating in the 3.5 GHz radio frequency (RF) spectrum band, may be configured with different user tiers. Higher-tier users (e.g., naval radar, satellite ground stations, etc.) may have higher priority to access frequency channels of the network than lower-tier users, which may include cells of the spectrum sharing network, and the user devices served by the cells.

Cells of a spectrum sharing network may receive (e.g., from a spectrum access system (SAS), from a higher-tier user, etc.) a request for lower-tier users to vacate a frequency channel or switch to another frequency channel. When multiple cells or a cluster of cells change frequency channels simultaneously or during overlapping periods of time, a user device within the coverage area of multiple cells may be unable to connect with a cell for a period of time. Accordingly, user devices may be dropped by the cells, may not be able to connect with the cells, or may experience a delay in reconnecting with the cells, despite being within the coverage area of one or more of the cells. Thus, user devices of the spectrum sharing network may experience radio link failure (RLF), which may interrupt service for user devices in the spectrum sharing network.

SUMMARY

Described features are directed to staggered frequency channel changing for cells of spectrum sharing networks. In some examples users communicating on frequency channels of a spectrum sharing network may receive an indication that one or more of the frequency channels are to be vacated. The indication may indicate that the frequency channels are not to be transmitted on or otherwise used for communications by lower-tier users of a spectrum sharing network, such as the cells. Cells of the spectrum sharing network that receive the indication may perform staggered channel changes that may be sequential or randomly timed. One or more of the cells may initiate a timer in response to receiving the indication, where the timer is set to a random duration by the cell. When the timer expires for a particular cell, that cell may then transmit a handover indication to wireless devices being served by the cell, so that the wireless devices handover to a new cell, for example, that is using a different frequency channel. In other examples, a coordinating device may receive the indication, identify cells in the spectrum sharing network that are using the frequency channel to be vacated, and determine a channel change order for those cells. The coordinating device can be one of the cells of the spectrum sharing network, or may be another wireless device in the spectrum sharing network. The coordinating device can then determine a channel change timing for one or more other cells in the spectrum sharing network. The channel change timing can be based on the channel change order and provided to the cells that are to vacate the channel. The cells may then use the channel change timing to stagger when the cells vacate the frequency channel. Staggered channel changes, for example using a coordinating device or a random timer, may facilitate handover of user devices of the spectrum sharing network by, for example, reducing a number of cells that are simultaneously undergoing a channel change procedure. Thus, staggered frequency channel changing may reduce user service interruptions or radio link failures.

A method for wireless communication at a coordinating device of a spectrum sharing network is described. The method may include receiving, at the coordinating device, an indication that a frequency channel is to be vacated; identifying a plurality of cells of the spectrum sharing network that are using the frequency channel; determining a channel change order for the plurality of cells; and providing, to at least one cell of the plurality of cells, an indication of a channel change timing that is based at least in part on the determined channel change order.

An apparatus for wireless communication at a coordinating device of a spectrum sharing network is described. The apparatus may include a processor, memory in electronic communication with the processor, and instructions stored in the memory. The instructions may be operable, when executed by the processor, to cause the apparatus to receive, at the coordinating device, an indication that a frequency channel is to be vacated; identify a plurality of cells of the spectrum sharing network that are using the frequency channel; determine a channel change order for the plurality of cells; and provide, to at least one cell of the plurality of cells, an indication of a channel change timing that is based at least in part on the determined channel change order.

Another apparatus for wireless communication at a coordinating device of a spectrum sharing network is described. The apparatus may include means for receiving, at the coordinating device, an indication that a frequency channel is to be vacated; means for identifying a plurality of cells of the spectrum sharing network that are using the frequency channel; means for determining a channel change order for the plurality of cells; and means for providing, to at least one cell of the plurality of cells, an indication of a channel change timing that is based at least in part on the determined channel change order.

A non-transitory computer-readable medium storing code for wireless communication at a coordinating device of a spectrum sharing network is described. The code may include instructions executable by a processor to receive, at the coordinating device, an indication that a frequency channel is to be vacated; identify a plurality of cells of the spectrum sharing network that are using the frequency channel; determine a channel change order for the plurality of cells; and provide, to at least one cell of the plurality of cells, an indication of a channel change timing that is based at least in part on the determined channel change order.

Some examples of the method, apparatuses, or non-transitory computer-readable medium may include operations, features, means, or instructions for determining the channel change order for the plurality of cells based at least in part on a number of user devices associated with at least one cell of the plurality of cells, or a radio condition associated with the at least one cell, or a type of service for user devices associated with the at least one cell, or a combination thereof.

Some examples of the method, apparatuses, or non-transitory computer-readable medium may include operations, features, means, or instructions for providing, to a first cell of the at least one cell, an indication of a different frequency channel for the first cell to change to.

Some examples of the method, apparatuses, or non-transitory computer-readable medium may include operations, features, means, or instructions for providing, to a first cell of the at least one cell, an indication of a channel change timing for a second cell of the spectrum sharing network.

Some examples of the method, apparatuses, or non-transitory computer-readable medium may include operations, features, means, or instructions for providing an indication of a target cell to which a wireless device served by the at least one cell is to be handed over. Some examples may include operations, features, means, or instructions for providing an indication of the frequency channel of the target cell.

In some examples of the method, apparatuses, or non-transitory computer-readable medium, the coordinating device may be one of the plurality of cells. In some examples of the method, apparatuses, or non-transitory computer-readable medium, the indication that the frequency channel is to be vacated may be received from a higher-tier user or a SAS.

A method for wireless communication at a cell of a spectrum sharing network is described. The method may include communicating with one or more wireless devices served by the cell via a frequency channel of the spectrum sharing network; receiving an indication that the frequency channel is to be vacated; initiating a timer in response to receiving the indication, the timer set to a random duration; and transmitting, upon an expiration of the timer, a handover indication to the one or more wireless devices.

An apparatus for wireless communication at a cell of a spectrum sharing network is described. The apparatus may include a processor, memory in electronic communication with the processor, and instructions stored in the memory. The instructions may be operable, when executed by the processor, to cause the apparatus to communicate with one or more wireless devices served by the cell via a frequency channel of the spectrum sharing network; receive an indication that the frequency channel is to be vacated; initiate a timer in response to receiving the indication, the timer set to a random duration; and transmit, upon an expiration of the timer, a handover indication to the one or more wireless devices.

Another apparatus for wireless communication at a cell of a spectrum sharing network is described. The apparatus may include means for communicating with one or more wireless devices served by the cell via a frequency channel of the spectrum sharing network; means for receiving an indication that the frequency channel is to be vacated; means for initiating a timer in response to receiving the indication, the timer set to a random duration; and means for transmitting, upon an expiration of the timer, a handover indication to the one or more wireless devices.

A non-transitory computer-readable medium storing code for wireless communication at a cell of a spectrum sharing network is described. The code may include instructions executable by a processor to communicate with one or more wireless devices served by the cell via a frequency channel of the spectrum sharing network; receive an indication that the frequency channel is to be vacated; initiate a timer in response to receiving the indication, the timer set to a random duration; and transmit, upon an expiration of the timer, a handover indication to the one or more wireless devices.

Some examples of the method apparatuses, or non-transitory computer-readable medium may include operations, features, means, or instructions for changing to a new frequency channel and vacating the frequency channel.

Some examples of the method apparatuses, or non-transitory computer-readable medium may include operations, features, means, or instructions for receiving an indication of a new frequency channel to which the cell is to change.

Some examples of the method apparatuses, or non-transitory computer-readable medium may include operations, features, means, or instructions for selecting a new frequency channel to which to change from among a set of one or more frequency channels based at least in part on receiving the indication that the frequency channel is to be vacated.

Some examples of the method apparatuses, or non-transitory computer-readable medium may include operations, features, means, or instructions for transmitting, to the one or more wireless devices served by the cell, an indication of a different frequency channel, or a different cell, or a different RAT, or a combination thereof.

In some examples of the method, apparatuses, or non-transitory computer-readable medium, the indication that the frequency channel is to be vacated may be received from a higher-tier user, a SAS, or another cell of the spectrum sharing network.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
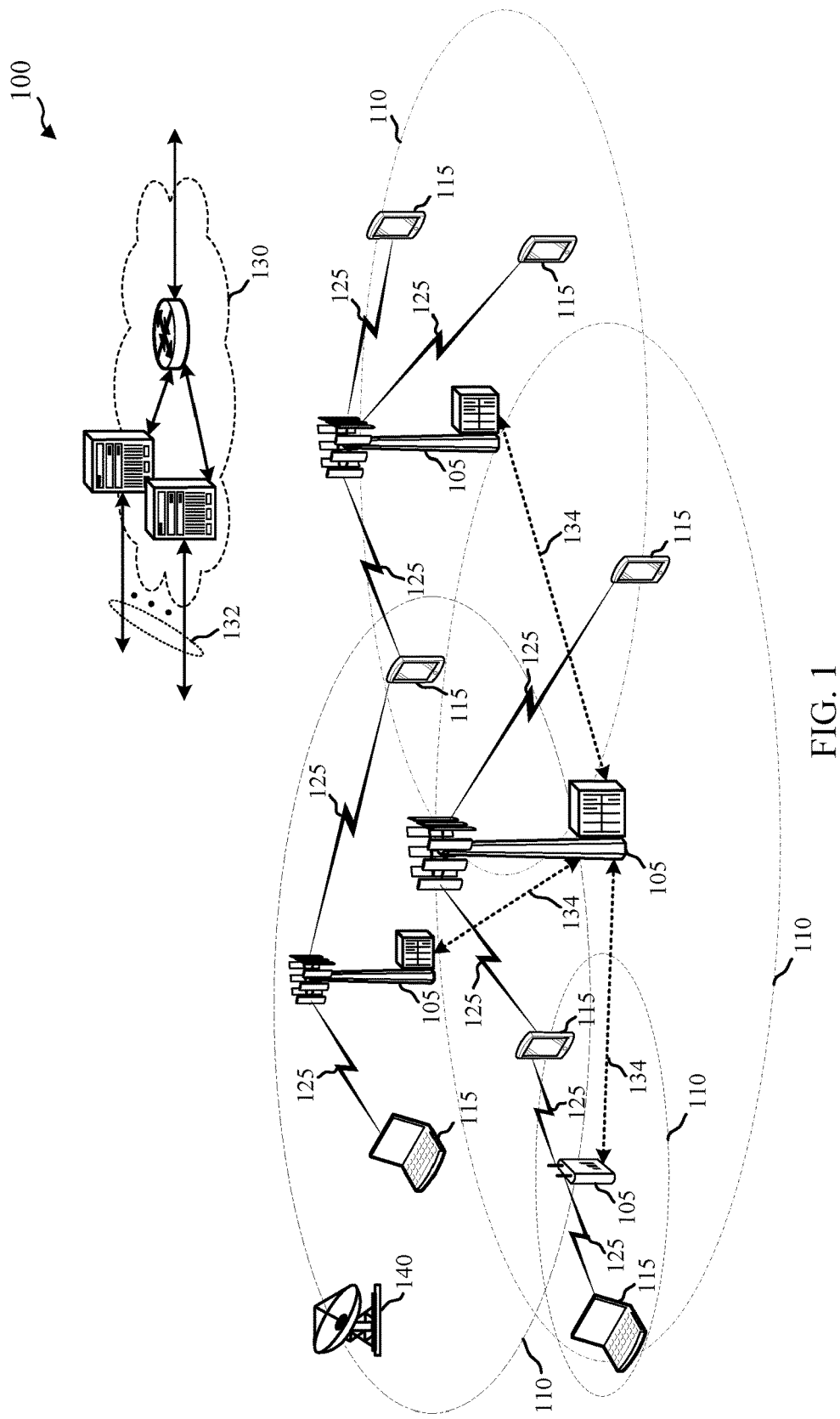
FIG. 1 shows a diagram of a wireless communication system, in accordance with various aspects of the present disclosure.

Described features are directed to staggered frequency channel changing for cells of spectrum sharing networks. For example, users communicating on one or more frequency channels of a spectrum sharing network may receive an indication that those channels are to be vacated. In some examples the indication may be determined so that lower-tier users may vacate the frequency channels in response to incoming higher-tier users, so that the higher-tier users may access the frequency channels. One or more cells of the spectrum sharing network or a coordinating device may receive the indication and perform staggered (e.g., sequential or randomly timed) channel changes, which may facilitate handover of user devices of the spectrum sharing network served by the one or more cells.

In some examples, a coordinating device may receive an indication that one or more channels are to be vacated. The coordinating device may be one of the cells serving the user devices or a separate central controller of the spectrum sharing network. In various examples the indication that channels are to be vacated may be received from a higher-tier user or a spectrum access system (SAS). The coordinating device may identify cells of the spectrum sharing network that need to change channels, and may indicate to the cells an order in which the cells are to vacate the one or more channels. Each of the cells may provide, in their respective order, a handover indication to user devices served by the respective cell. The cells may then change channels to a new frequency channel. Upon receiving the handover indication, a user device may connect with a different serving cell of the network, using the same or different channels. The user device may also reconnect to the same cell on a different channel than the channel being vacated, after the cell has changed channels. By coordinating an ordered change of channels, user devices are less likely to experience a radio link failure (RLF) because other serving cells may be available, or a new channel may be indicated in advance to facilitate handover.

In some examples, cells of the spectrum sharing network may receive (e.g., from a higher-tier user or a SAS) an indication that one or more channels are to be vacated. In these examples, each of the cells, in a distributed fashion (e.g., without explicit instruction form a coordinating device), may initiate a timer having a random duration. Upon expiration of the timer, the cell may provide a handover indication to user devices served by the cell. Upon receiving the handover indication, the respective user device may initiate a handover procedure, for example, as described herein. The handover procedure for the user devices may be synchronized with the change of channels of their respective serving cell. Implementing a timer having a random duration may cause handovers of user devices from each of the cells to be staggered even in the absence of a coordinating device, reducing a likelihood that multiple cells switch channels at the same time or in an overlapping manner. Thus, the distributed switching may eliminate overhead associated with a coordinating device and reduce instances of RLF for user devices.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 that supports staggered frequency channel changing for cells of a spectrum sharing network, in accordance with various aspects of the disclosure. The wireless communications system 100 includes base stations 105, user equipment (UEs) 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

Base stations 105 may wirelessly communicate with the UEs 115 (e.g., using various radio access technologies (RATs) or wireless technologies) via one or more base station antennas. Each base station 105 may provide communication coverage for a respective coverage area 110. For example, each base station 105 may provide communication coverage for a macro cell, a small cell, or other types of cell. In some examples, base stations 105 may be macro cells, small cells, hot spots, or the like. The coverage area 110 for a base station 105 may be divided into sectors (not shown) making up a portion of the coverage area. The wireless communications system 100 may include base stations 105 of different types (e.g., macro or small cell base stations). There may be overlapping coverage areas 110 for different technologies.

In some examples, a base station 105 may be referred to as a base transceiver station, a radio base station, an access point, a radio transceiver, a NodeB, an evolved NodeB (eNB), a Home NodeB, or a Home eNodeB. A base station 105 may also be referred to as a Radio Network Controller (RNC), a Base Station Controller (BSC), a Base Transceiver Station (BTS), a Base Station (BS), a Transceiver Function (TF), a Radio Router, a Radio Transceiver, a Basic Service Set (BSS), an Extended Service Set (ESS), a Radio Base Station (RBS), or some other suitable terminology.

In some examples, operations associated with a base station 105 may be performed by separate components, which may be collectively referred to as an access node (AN). In various examples an AN may be referred to as a new radio base station (NR BS), a new radio Node-B (NR NB), a network node (NN), or the other terminology. An AN may include a central unit (CU) and one or more distributed units (DUs) associated with the CU. In some examples a CU may be referred to as an access node controller (ANC), or other terminology. A DU may be referred to as an edge node (EN), an edge unit (EU), a radio head (RH), a smart radio head (SRH), a transmission and reception point (TRP), or other terminology. In such examples, each of the DUs may provide communication coverage for a respective coverage area 110, and may provide one or more remote transceivers associated with a CU. Thus, an AN of a wireless communication network may communicate with a number of UEs 115 via one or more DUs associated with the CU, and each of the DUs associated with an AN may be an example of a cell, as described herein.

In some examples, the wireless communications system 100 may include an LTE/LTE-A network. In LTE/LTE-A networks, the term eNB may be used to describe the base stations 105, while the term UE may be used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, or other types of cell. Additionally or alternatively, base stations 105 and UEs 115 may communicate according to a wireless local area network (WLAN) radio and baseband protocol for physical and media access control layers from Institute of Electrical and Electronics Engineers (IEEE) 802.11 and versions including, but not limited to, 802.11b, 802.11g, 802.11a, 802.11n, 802.11ac, 802.11ad, 802.11ah, 802.11ax, etc. The wireless communications system 100 may be capable of supporting communication with multiple users by sharing the available system resources (e.g., time, frequency, and power). Examples of such multiple-access systems include CDMA systems, TDMA systems, FDMA systems, and OFDMA systems. In some examples, peer-to-peer connections or ad hoc networks may be implemented within the wireless communications system 100.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The term "cell" as used herein may be used to describe a base station, an access point, a DU, a carrier or component carrier associated with a base station, or a coverage area (e.g., sector, etc.) of a carrier or base station, depending on context. A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. A base station may support one or multiple (e.g., two, three, four, and the like) cells (e.g., component carriers).

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of things (IoT) device, an Internet of Everything (IoE) device, a machine type communication (MTC) device, an appliance, an automobile, or the like. A UE may be able to communicate with various types of base stations and network equipment, including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described herein. Each modulated signal may be sent on a different sub-carrier and may carry control information (e.g., reference signals, control channels, etc.), overhead information, user data, etc. The communication links 125 may transmit bidirectional communications using frequency division duplexing (FDD) (e.g., using paired spectrum resources) or time division duplexing (TDD) operation (e.g., using unpaired spectrum resources). Frame structures for FDD (e.g., frame structure type 1) and TDD (e.g., frame structure type 2) may be defined.

Communication links 125 may also be established between UEs 115 in a configuration known as D2D communications. One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some types of wireless devices may provide for automated communication. Automated wireless devices may include those implementing Machine-to-Machine (M2M) communication or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving deep sleep mode when not engaging in active communications.

In some examples of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

A UE 115 may be configured to communicate using up to five component carriers (CCs) when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some cases, a UE 115 or base station 105 may operate in a shared or unlicensed frequency spectrum. These devices may perform a listen-before-talk (LBT) procedure such as a clear channel assessment (CCA) prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power is that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

In some examples, the wireless communications system 100 may include a spectrum sharing network, such as those operating on a 3.5 GHz RF spectrum band, which may share radio frequency resources according to regulated user tiers. For example, according to certain Federal Communications Commission (FCC) regulations pertaining to the use of the 3.5 GHz RF spectrum band, user tiers from higher-tier to lower-tier may include an incumbent access tier (e.g., federal users, grandfathered licensed users, naval radar, satellite ground stations, etc.), a priority access tier (e.g., hospitals, utilities, public-safety entities, etc.) and a general authorized access tier (e.g., general public users). Under some operating scenarios, a higher-tier user (e.g., higher-tier user 140) may have higher priority to access all of, or a portion of a regulated RF spectrum band. To exercise such priority, the higher-tier user 140 or a central controlling entity (e.g., a core network device, a SAS, etc.) may send an indication to lower-tier users (e.g., base stations 105, UEs 115, etc.) of the regulated radio frequency resources to vacate one or more frequency channels. In some examples the lower-tier users may be required to vacate the channels after such an indication within a certain period of time (e.g., within 60 seconds according to certain FCC regulations of the 3.5 GHz spectrum).

In some examples a spectrum sharing network may include a collection of cells (e.g., small cells, DUs, base stations, access points, etc.) characterized by relatively high cell density. High cell density may provide overlapping coverage areas 110 which may support a UE 115 being able to connect to one of a number of cells at a given location (e.g., coverage redundancy). When such a collection of cells receives an indication to vacate a frequency channel of the spectrum sharing network, each of the cells may perform a channel change procedure in which a respective cell vacates a channel previously used to serve one or more user devices (e.g., UEs 115), then changes channels to operate on a new frequency channel to serve user devices. Such channel change procedures may result in a period when the cell is unavailable for communications with user devices (e.g., UEs 115) served by the cell, which may cause a disruption of service at the user devices. As described herein, staggered channel changing (e.g., sequential or randomly-timed channel changing) for cells of such spectrum sharing networks may provide opportunities for wireless devices to change cells and/or frequency channels in a manner that mitigates such service disruptions, and improves user experience.

Figure 2:
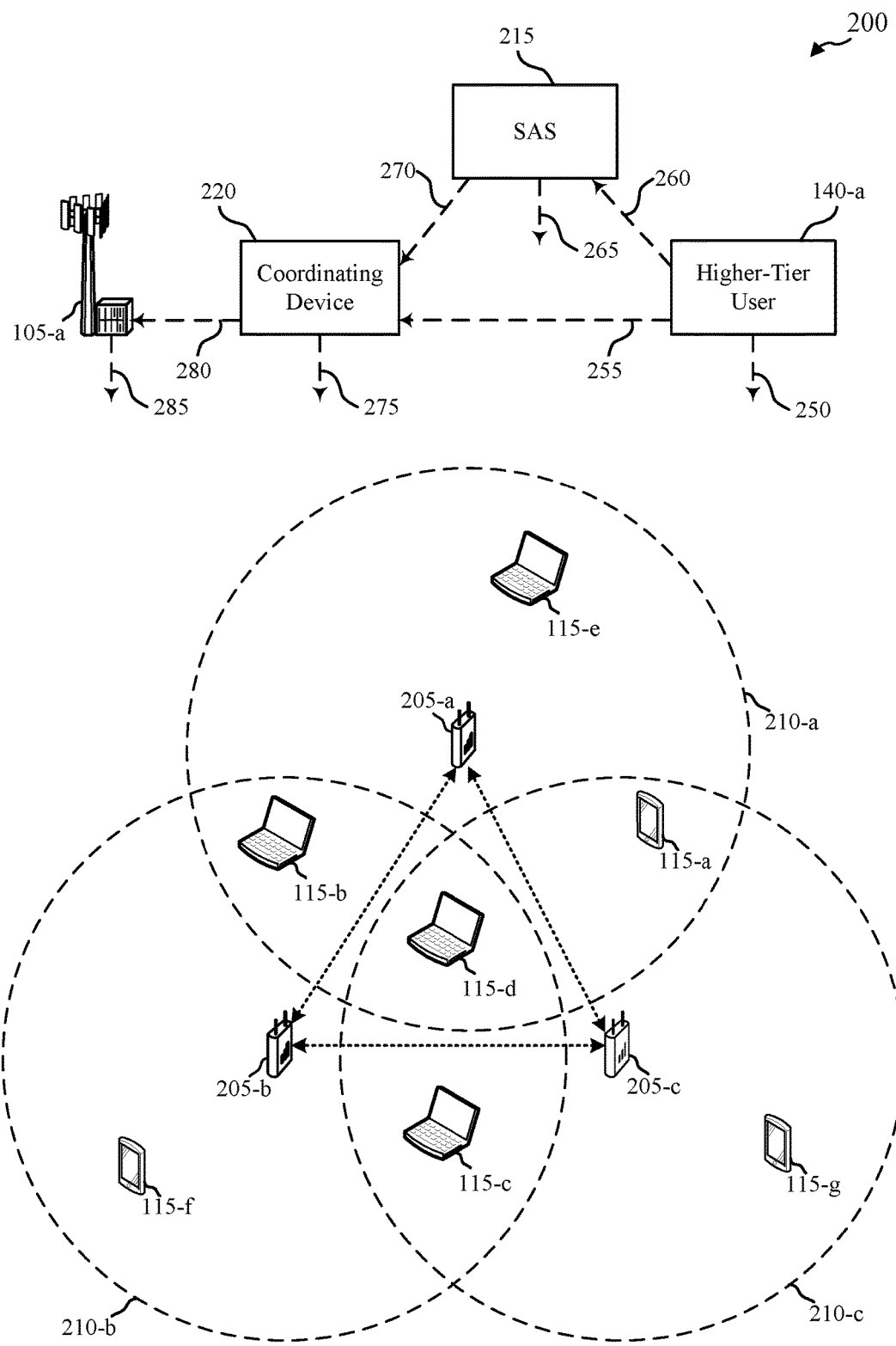
FIG. 2 illustrates an example of a spectrum sharing network that supports staggered channel changing for cells in accordance with aspects of the present disclosure.

FIG. 2 illustrates an example of a spectrum sharing network 200 that supports staggered frequency channel changing for cells of a spectrum sharing network, in accordance with aspects of the present disclosure. The spectrum sharing network 200 may include one or more of UEs 115, a higher-tier user 140-a, cells 205, a SAS 215, a coordinating device 220, or a base station 105-a.

The cells 205 may include cells 205-a, 205-b, and 205-c, which may be associated with coverage areas 210-a, 210-b, and 210-c, respectively. Various UEs 115 may be distributed throughout the spectrum sharing network 200, including locations within one or more coverage areas 210. For example, UEs such as UE 115-e may be located within coverage area 210-a, UEs such as UE 115-f may be located within coverage area 210-b, and UEs such as UE 115-g may be located within coverage area 210-c. In some examples, UEs may be located within more than one coverage area 210. For example, UEs such as UE 115-a may be located within both of coverage areas 210-a and 210-c, UEs such as UE 115-b may be located within both coverage areas 210-a and 210-b, UEs such as UE 115-c may be located within both of coverage areas 210-b and 210-c, and UEs such as UE 115-d may be located within all three of coverage areas 210-a, 210-b, and 210-c. Although three coverage areas 210 associated with three cells 205 are shown in the spectrum sharing network 200, a spectrum sharing network may include fewer cells, or many more cells (e.g., tens of cells, hundreds of cells, etc.). The cells may have various degrees of overlap, for example more than three or fewer than two coverage areas may overlap at a given location. The features and operations associated with staggered frequency channel changing described herein may be applied accordingly.

Spectrum sharing network 200 may operate according to user tiers, wherein a higher-tier user (e.g., higher-tier user 140-a) may have priority to use a frequency channel over lower-tier users (e.g., UEs 115, cells 205, etc.). The lower-tier users using the frequency channel may be required to vacate the frequency channel upon receiving a message to vacate the frequency channel, for example a request to vacate from a higher-tier user. An indication to vacate a frequency channel may therefore be distributed across the spectrum sharing network 200 in various ways to provide access to the frequency channel for the higher-tier user 140-a. Upon receiving such an indication, lower-tier users of the frequency channel to be vacated may change to a new frequency channel.

In various examples, an indication to vacate a frequency channel of the spectrum sharing network may be based on a location of the higher-tier user 140-a. For example, the higher-tier user 140-a may be moving towards coverage areas 210 of the spectrum sharing network 200, and may require the lower-tier users (e.g., cells 205, UEs 115, etc.) of a frequency channel of the shared spectrum to vacate the frequency channel before the higher-tier user 140-a enters one or more coverage areas 210. In some examples the higher-tier user 140-a may already be in the proximity of the spectrum sharing network 200, and may be initializing a communication system or operation that requires the use of the frequency channel, or may otherwise require low interference over the frequency channel.

Indications to vacate a frequency channel of the shared spectrum network may be provided by various devices, and may be used, modified, and/or forwarded for various operations described herein. For example, the higher-tier user 140-a may itself transmit an indication to vacate a frequency channel via messaging 250, which may be received by various lower-tier users in the shared spectrum network, such as those cells 205 and/or UEs 115 that are near the higher-tier user 140-a, those cells 205 and/or UEs 115 that are in an area that the higher-tier user 140-a will be passing through. In some examples the higher-tier user 140-a may provide an indication that a frequency channel is to be vacated to SAS 215 via messaging 260, and the SAS 215 may provide further messaging to other devices as described herein.

In some examples, the SAS 215 may identify a need to vacate a frequency channel, and may transmit an indication to vacate the frequency channel by way of messaging 265. In some examples, a coordinating device 220 may similarly identify a need to vacate a frequency channel, and transmit (e.g., to cells 205 and/or UEs 115, etc.) an indication to vacate the frequency channel by way of messaging 275. In various examples the SAS 215 or the coordinating device 220 may make their own determination that a frequency channel is to be vacated (e.g., based on a location and/or direction and rate of travel of the higher-tier user 140-a, services used by the higher-tier user 140-a, frequency channels used by one or more cells 205 or UEs 115 of the spectrum sharing network 200, a location of one or more cells 205 or UEs 115 of the spectrum sharing network 200, etc.). In some examples the coordinating device 220 may receive an indication to vacate a frequency channel from the higher-tier user 140-a via messaging 255 or from the SAS 215 via messaging 270. In some examples, the coordinating device 220 may be one of the cells 205 of the spectrum sharing network, and the cell 205 may be configured to perform various operations of a coordinating device as described herein. In other examples the coordinating device 220 may be a separate device (e.g., a controller of the spectrum sharing network 200, a network controller of a core network 130, a CU, an eNB, etc.). In some examples the coordinating device 220 may provide, via messaging 280, an indication to vacate a frequency channel to an eNB of the spectrum sharing network (e.g., the base station 105-a), and the cell 205 may transmit the indication to devices of the spectrum sharing network via messaging 225.

In various examples, messaging 250, 255, 260, 265, 270, 275, or 280 may be provided by way of wired and/or wireless communications, which may include wired backhaul links, wired device-to-device links, wireless communications links according to various radio access technologies, and so on. Furthermore, indications to vacate a frequency channel may be provided by way of broadcast, multicast, or unicast communications. For example, the higher-tier user 140-a, the SAS 215, the coordinating device 220, or the base station 105-a may provide a wireless broadcast message that may be received by any device within a coverage area of the providing device. In another example, the higher-tier user 140-a, the SAS 215, the coordinating device 220, or the base station 105-a may provide unique messaging intended for a single device, or for a group of devices (e.g., a subset of the devices of the spectrum sharing network). In some examples, a broadcast indication to vacate a frequency channel may be received by a set of devices of the spectrum sharing network, but may indicate that a subset of the devices need to vacate the channel, wherein the subset may be determined based on the locations of respective devices (e.g., those devices that are close to a higher-tier user, etc.), the type of respective devices (e.g., cells 205 versus UEs 115, etc.), or other criteria.

In some examples, the coordinating device 220 may determine a sequence for cells 205 to change frequency channels. For example, having identified a need to vacate a frequency channel of the spectrum sharing network 200, the coordinating device 220 may identify a plurality of cells 205 that are using the frequency channel to be vacated. The coordinating device 220 may the determine a channel change order for the plurality of cells 205. In some examples, the change order may be determined based at least in part on a number of user devices (e.g., UEs 115) associated with at least one cell 205 of the plurality of cells, or a radio condition associated with the at least one cell 205, or a type of service for user devices associated with the at least one cell, or a combination thereof.

Having determined the channel change order for the plurality of cells, the coordinating device 220 may provide, to at least one cell 205 of the plurality of cells, an indication of a channel change timing that is based at least in part on the determined channel change order. In some examples the provided indication of the channel change timing may be a message to trigger a single cell 205 to change frequency channels, and may be followed by another message to trigger a channel change for another cell 205. In some examples the indication of the channel change timing may be a single broadcast message that may be received by multiple cells 205, but indicates the order for cells to change channels. In such an example, a receiving cell 205 may wait until identifying that a preceding cell 205 of the channel change order has completed a channel change before initiating a channel change procedure. In some examples, the indication of the channel change timing may be a single broadcast message that may be received by multiple cells 205, and indicates a particular time for each of the respective cells 205 to perform a channel change operation.

In some examples, the coordinating device 220 may provide an indication of a different frequency channel for a respective cell 205 to change to. For example, the coordinating device 220 may have identified one or more frequency channels that are available (e.g., not to be vacated, not used by other devices, etc.), and may provide an indication of the identified channels that are available to the cells 205 of the spectrum sharing network 200. In some examples, the coordinating device 220 may determine a distribution of frequency channels to promote frequency channel diversity throughout the spectrum sharing network 200, and may indicate different frequency channels for the cells 205 to change to in a manner that promotes and/or maintains frequency channel diversity. In some examples the coordinating device 220 may be aware of busy frequency channels, or channels that should be avoided to reduce interference in the vicinity of certain cells 205. In such examples the coordinating device 220 may identify channels other than those busy channels or channels to be otherwise avoided, and indicate those other frequency channels to the cells 205.

In some example the coordinating device 220 may provide an indication of different channel change timing for more than one cell 205 (e.g., in a broadcast message, including such additional information in a dedicated message for a particular cell 205, etc.). In such examples, the receiving cell 205 may forward the additional information to UEs 115 that are served by the cell 205. For example, a cell 205 may indicate to user devices served by the cell 205 whether another cell 205 has already changed frequency channel. In this way, the coordinating device 220 may facilitate handovers by preventing UEs 115 from handing over to cells 205 that have not yet changed to a new frequency channel. In some examples, the coordinating device 220 may explicitly or implicitly indicate a target cell 205 to which user devices served by the receiving cell 205 should be handed over. In other examples, the coordinating device 220 may include an indication to the user devices of a frequency channel used by the target cell 205.

In some examples, cells 205 of the spectrum sharing network 200 may support staggered channel changing without the assistance of the coordinating device 220. For example, each of the cells 205 may receive an indication to vacate a frequency channel (e.g., via messaging 250, 265, 275, and/or 285) without a sequence or timing included with the indication. In such examples, the cells 205 may delay a frequency channel change until a random duration has passed to vacate the frequency channel. For example, the cells 205 may initiate a timer having a random or pseudo-random duration from the time the indication is received, and perform a channel change operation, vacating the original channel and changing to a new channel, after the timer expires. In other examples the cells may not rely on a separate timer, but otherwise delay a channel change operation according to a random or pseudo-random duration, for example upon reaching a randomly-determined time of a system clock.

Prior to performing a channel change operation, a cell 205 may transmit a handover indication to user devices (e.g., UEs 115) so that the user devices may perform handover procedures to be served by a new cell 205, or in some examples to be served by the same cell 205 but on a different frequency. By supporting channel change staggering according to random durations after receiving an indication to vacate a channel, cells 205 of the spectrum sharing network may be more likely to be available for such handovers than cells configured to change channels in a non-staggered manner.

As used herein, the described "random" durations and/or timers need not be entirely random. For example, the random duration may be bound by certain minimums and maximums as configured for the spectrum sharing network 200. For example, a minimum duration may be configured as a value that supports channel change transitions, such as a handoff of parameters, an indication to user devices that a channel change is pending, and the like. A maximum duration may be configured such that a frequency channel may be vacated prior to a time limit for vacating a frequency channel, such as a time limit defined by a regulatory requirement (e.g., a requirement to vacate a channel within 60 seconds according to certain FCC regulations). The minimum and/or maximum may be configured as universal values applied throughout the spectrum sharing network 200, or be configured as a device-specific values. Device-specific values may be based at least in part on a type of device, a proximity to other devices, an amount of traffic, a number of devices served by the respective device, and the like. Furthermore, the described "random" durations and/or timers may have weighting functions that may be described as "pseudo-random," including parameters that might shift the result of a randomizing function to provide a longer or shorter duration. For example, various offsets and/or multipliers may be determined by a particular cell 205 based on a number of UEs 115 served by the cell 205, a quantity of neighbor cells 205 in proximity to the particular cell 205, a number of UEs 115 served by the neighbor cells 205, types of services of UEs 115, and the like. Thus, as described herein, "random" may refer to a duration bound by a certain range of values, and/or weighted by various parameters and/or determinations, and may be described as "pseudo random" according to some interpretations.

Under either a coordinated or a randomly-timed scenario, UEs 115 may use various determinations and/or signaling to facilitate handover. For example, if UE 115-a is being served by cell 205-a, and receives a handover indication, UE 115-a may perform a cell reselection procedure to be served by cell 205-c. UE 115-a may perform such a reselection be determining an availability of cell 205-c, a frequency channel used by cell 205-c, services supported by cell 205-c, or any combination thereof. In some examples, such information may be provided to the UE 115-a as part of messaging associated with the handover indication (e.g., such information regarding cell 205-c may have been determined by cell 205-a, determined by a central controller of the spectrum sharing network 200, etc.). When a UE 115 is served by more than two cells 205 (e.g., UE 115-d), such a UE 115 may receive a handover indication and determine a preferred cell 205 by comparing various parameters determined or otherwise provided to the UE 115. In other examples, a UE may receive an explicit indication to hand over to a particular cell 205, which may include an indication of the frequency channel to use. In other examples, UEs 115 may be within a coverage area 210 of a single cell 205 (e.g., UEs 115-e, 115-f, and 115-g), and such UEs may need to wait for the serving cell 205 to complete a channel change before resuming communications, or switch to another frequency channel that is simultaneously being used by the serving cell 205.

Figure 3:
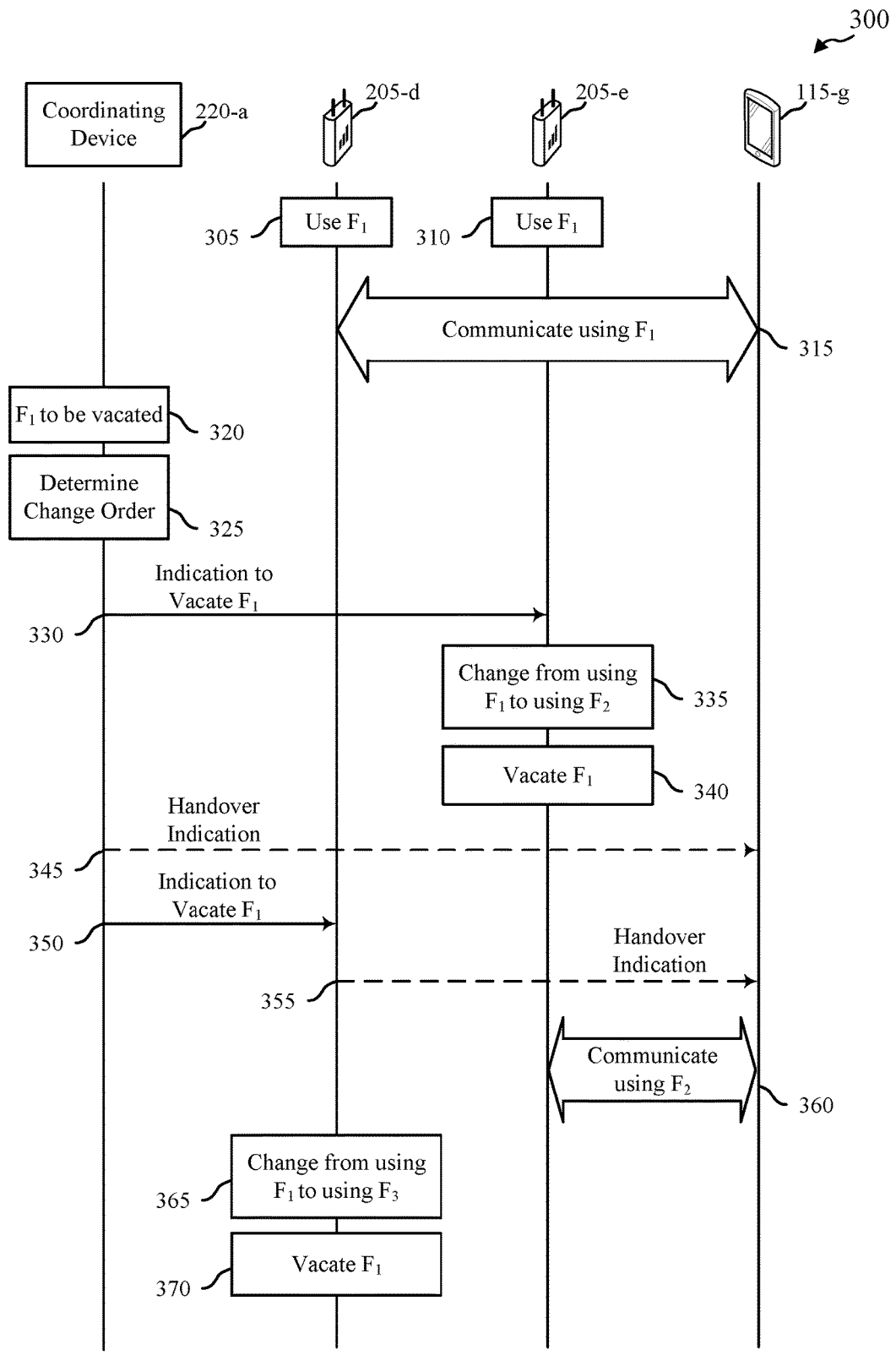
FIGS. 3 and 4 illustrate examples of communications procedures that support coordinated channel changing for cells of spectrum sharing networks in accordance with aspects of the present disclosure.

FIG. 3 illustrates an example of a communications procedure 300 that supports coordinated channel changing for cells of spectrum sharing networks in accordance with aspects of the present disclosure. The communications procedure 300 may include messaging and operations performed by and/or between a coordinating device 220-a, a first cell 205-d, a second cell 205-e, and a UE 115-g that may be located within a coverage area 210 of both the first cell 205-d and the second cell 205-e. In some examples the coordinating device 220-a may be another cell 205 of the spectrum sharing network, or may be included in (e.g., a portion of, a module of, etc.) either the first cell 205-d or the second cell 205-e.

At 305, the first cell 205-d may be configured to use a first frequency channel $F_1$, and at 310 the second cell 205-e may be configured to use the first frequency channel $F_1$. In other words, both the first cell 205-d and the second cell 205-e may be configured to serve various user devices on the same frequency channel. One or both of the first cell 205-d or second cell 205-e may support using additional frequency channels in addition to $F_1$. At 315, the UE 115-g may communicate with the first cell 205-d using the first frequency channel $F_1$.

At 320, the coordinating device 220-a may identify that the first frequency channel $F_1$ is to be vacated. For example, as described herein, the coordinating device may receive an indication from a higher-tier user and/or an SAS (e.g., via messaging 255 or 270 as described with reference to FIG. 2). In other examples, the coordinating device 220-a may otherwise determine that the frequency channel is to be vacated, as described herein. For example, coordinating device 220-a may make the determination based on a location and/or movement of a higher-tier user or detection of a higher-tier user initializing a service.

At 325, the coordinating device 220-a may determine a channel change order for a plurality of cells, including the first cell 205-d and the second cell 205-e. Determining the channel change order at 325 may include, or may be preceded by identifying the plurality of cells as those using the first frequency channel $F_1$, which may be a subset of cells for which the coordinating device 220-a is coordinating (e.g., a subset of cells of the spectrum sharing network that includes the coordinating device 220-a). Determining the channel change order at 325 may be based at least in part on a number of user devices associated with the cells 205-d or 205-e (e.g., served by the cells), a radio condition associated with the cells 205-d or 205-e, a type of service for user devices associated with the cells 205-d or 205-e, or any combination thereof. As described herein, the communications procedure 300 may include the coordinating device 220-a determining that the second cell 205-e should change channel prior to the first cell 205-d changing channel.

At 330, the coordinating device 220-a may provide an indication of a channel change timing to the second cell 205-e, wherein the channel change timing may be based at least in part on the channel change order determined at 325. In some examples, the indication provided at 330 may include not only an indication of a channel change timing for the second cell 205-e, but also an indication of a channel change timing for another cell (e.g., the first cell 205-d). In some examples the indication provided to the second cell 205-e at 330 may include an indication of a frequency channel for the second cell 205-e to change to, and/or an indication of a frequency channel that the first cell 205-d will change to. Additionally or alternatively, the indication at 330 may include an indication of a target cell to which user devices served by the second cell 205-e should be handed over to.

At 335, the second cell 205-e may change from using the first frequency channel $F_1$ to using a second frequency channel $F_2$. In some examples the second cell 205-e may have already been using the second frequency channel $F_2$, and at 335 the second cell 205-e may simply move operations associated with the first frequency channel $F_1$ to the second frequency channel $F_2$. In other examples (e.g., when the second cell 205-e supports using a single frequency channel at a time, or otherwise uses one frequency channel at a time), the second cell 205-e may cease using the first frequency channel $F_1$, reconfigure a radio device (e.g., a transmitter, a receiver, a transceiver, etc.) to support using the second frequency channel $F_2$, and proceed with using the second frequency channel $F_2$. Consequently, at 340 the second cell 205-e may vacate the first frequency channel $F_1$.

Following the second cell 205-e changing to use the second frequency channel $F_2$, the UE 115-g may receive a handover indication to transition to a new cell (e.g., in advance of the first cell 205-d, which is serving communications with the UE 115-g, changing channel). In some examples, the coordinating device 220-a may provide such a handover indication at 345.

Additionally or alternatively, a handover indication may be provided by the first cell 205-d. For example, at 350, the coordinating device 220-a may provide an indication of a channel change timing to the first cell 205-d, wherein the channel change timing may again be based at least in part on the channel change order determined at 325. Although shown separately from the indication at 330, in some examples the indication at 350 may be provided at the same time as the indication at 330 (e.g., in concurrent unicast transmissions, in a broadcast transmission, etc.). In some examples the indication to the first cell 205-d to vacate the first frequency channel at 350 may be followed by the first cell 205-d transmitting a handover indication to the UE 115-g at 355.

Following a handover indication being received by the UE 115-g at 345 and/or 355, the UE may perform a handover procedure, which may be performed according to one or more parameters received in the handover indication(s) (e.g., an indication to hand over to the second cell 205-e, an indication to use the second frequency channel $F_2$, etc.).

Subsequently, the UE 115-g may communicate with the second cell 205-e using the second frequency channel $F_2$ at 360.

At 365, the first cell 205-d may change from using the first frequency channel $F_1$ to using a third frequency channel $F_3$, according to any of the operations described herein, which may be the same or different from those procedures performed by the second cell 205-e at 335. Moreover, the third frequency channel $F_3$ may be the same as, of different from the second frequency channel $F_3$. Consequently, at 370 the first cell 205-d may vacate the first frequency channel $F_1$.

Thus, as described with reference to the communications procedure 300, the UE 115-g may be handed over to the second cell 205-e in a manner that follows the changing of the second cell 205-e from using the first channel first frequency channel $F_1$ to using the second frequency channel $F_2$. By staggering the channel changes in the coordinated manner of communications procedure 300, the UE 115-g may therefore avoid service disruptions that may be associated with communicating with, or attempting to access a cell that is undergoing a channel change procedure.

Figure 4:
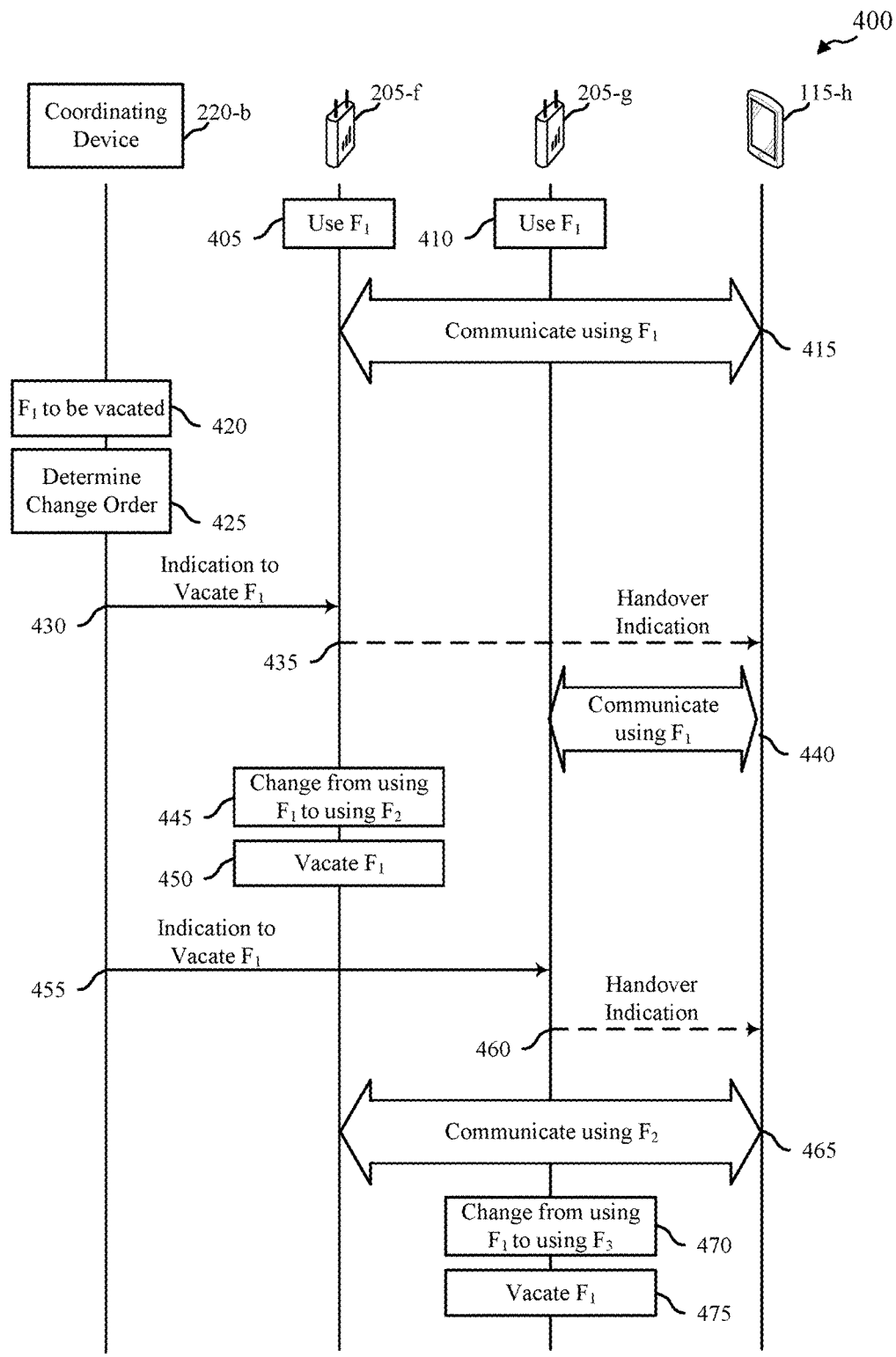

FIG. 4 illustrates another example of a communications procedure 400 that supports coordinated channel changing for cells of spectrum sharing networks in accordance with aspects of the present disclosure. The communications procedure 400 may include messaging and operations performed by and/or between a coordinating device 220-b, a first cell 205-f, a second cell 205-g, and a UE 115-h that may be located within a coverage area 210 of both the first cell 205-f and the second cell 205-g. In some examples the coordinating device 220-b may be another cell 205 of the spectrum sharing network, or may be included in (e.g., a portion of, a module of, etc.) either the first cell 205-f or the second cell 205-g.

At 405, the first cell 205-f may be configured to use a first frequency channel $F_1$, and at 410 the second cell 205-g may be configured to use the first frequency channel $F_1$. In other words, both the first cell 205-f and the second cell 205-g may be configured to serve various user devices on the same frequency channel (although one or both of the first cell 205-f or second cell 205-g may support using additional frequency channels as well). At 415, the UE 115-h may communicate with the first cell 205-f using the first frequency channel $F_1$.

At 420, the coordinating device 220-b may identify that the first frequency channel $F_1$ is to be vacated. For example, as described herein, the coordinating device 220-b may receive an indication from a higher-tier user and/or an SAS (e.g., via messaging 255 or 270 as described with reference to FIG. 2). In other examples, the coordinating device 220-b may otherwise determine that the frequency channel is to be vacated, as described herein (e.g., based on a location and/or movement of a higher-tier user, detection of a higher-tier user initializing a service, etc.)

At 425, the coordinating device 220-b may determine a channel change order for a plurality of cells, including the first cell 205-f and the second cell 205-g. Determining the channel change order at 425 may include, or may be preceded by identifying the plurality of cells as those using the first frequency channel $F_1$, which may be a subset of cells for which the coordinating device 220-b is coordinating (e.g., a subset of cells of the spectrum sharing network that includes the coordinating device 220-b). Determining the channel change order at 425 may be based at least in part on a number of user devices associated with the cells 205-f or 205-g (e.g., served by the cells), a radio condition associated with the cells 205-f or 205-g, a type of service for user devices associated with the cells 205-f or 205-g, or any combination thereof. As described herein, the communications procedure 400 may include the coordinating device 220-b determining that the first cell 205-f should change channel prior to the second cell 205-g changing channel.

At 430, the coordinating device 220-b may provide an indication of a channel change timing to the first cell 205-f, wherein the channel change timing may be based at least in part on the channel change order determined at 425. In some examples, the indication provided at 430 may include not only an indication of a channel change timing for the second cell 205-f, but also an indication of a channel change timing for another cell (e.g., the second cell 205-g). In some examples the indication provided to the first cell 205-f at 430 may include an indication of a frequency channel for the first cell 205-f to change to, and/or an indication of a frequency channel that the second cell 205-g will change to. Additionally or alternatively, the indication at 430 may include an indication of a target cell (e.g., the second cell 205-g) to which user devices served by the first cell 205-f should be handed over to.

Following the first cell 205-f receiving the indication to vacate the first frequency channel $F_1$, the first cell 205-f may transmit a handover indication to user devices served by the first cell 205-f (e.g., the UE 115-h). A handover indication may, additionally or alternatively, be transmitted by the coordinating device 220-b. The handover indication may include, or be accompanied by, an indication of a target cell to switch to (e.g., the second cell 205-g), an indication of a frequency channel of the target cell (e.g., the first frequency channel $F_1$), or both. Following a handover indication of 435 being received by the UE 115-h, the UE may perform a handover procedure, which may be performed according to one or more parameters received in the handover indication(s). Subsequently, the UE 115-h may communicate with the second cell 205-g using the first frequency channel $F_2$ at 440.

At 445, the first cell 205-f may change from using the first frequency channel $F_1$ to using a second frequency channel $F_2$. In some examples the first cell 205-f may have already been using the second frequency channel $F_2$, and at 445 the first cell 205-f may simply move operations associated with the first frequency channel $F_1$ to the second frequency channel $F_2$. In other examples (e.g., when the first cell 205-f supports using a single frequency channel at a time, or otherwise uses one frequency channel at a time), the first cell 205-f may cease using the first frequency channel $F_1$, reconfigure a radio device (e.g., a transmitter, a receiver, a transceiver, etc.) to support using the second frequency channel $F_2$, and proceed with using the second frequency channel $F_2$. Consequently, at 450 the second cell 205-g may vacate the first frequency channel $F_1$.

At 455, the coordinating device 220-b may provide an indication of a channel change timing to the second cell 205-g, wherein the channel change timing may again be based at least in part on the channel change order determined at 425. Although shown separately from the indication at 430, in some examples the indication at 455 may be provided at the same time as the indication at 430 (e.g., in concurrent unicast transmissions, in a broadcast transmission, etc.). In some examples the indication to the second cell 205-g to vacate the first frequency channel $F_1$ at 455 may be followed by the second cell 205-d transmitting a handover indication to UEs served by the second cell 205-g (e.g., UE 115-h) at 460.

Following the handover indication of 460 being received by the UE 115-h, the UE may perform a handover procedure according to one or more parameters received in the handover indication(s) (e.g., an indication to hand over to the first cell 205-f, an indication to use the second frequency channel $F_2$, etc.). Subsequently, the UE 115-h may return to communicating with the first cell 205-f at 465, but using the second frequency channel $F_2$. Although the communications procedure 500 shows the UE 115-h returning to communications with the first cell 205-f, in other examples UE 115-j may be handed over to a third cell (not shown) according to any of the procedures described herein.

At 470, the second cell 205-g may change from using the first frequency channel $F_1$ to using a third frequency channel $F_3$, according to any of the operations described herein, which may be the same or different from those procedures performed by the first cell 205-f at 445. Moreover, the third frequency channel $F_3$ may be the same as, of different from the second frequency channel $F_3$. Consequently, at 475 the second cell 205-g may vacate the first frequency channel $F_1$.

Thus, as described with reference to the communications procedure 400, the UE 115-h may hand over to the second cell 205-g before a channel change procedure of the second cell 205-g, and hand back to the first cell 205-f after a channel change procedure of the first cell 205-f. By staggering the channel changes in the coordinated manner of communications procedure 400, the UE 115-h may therefore avoid service disruptions that may be associated with communicating with, or attempting to access a cell that is undergoing a channel change procedure.

Figure 5:
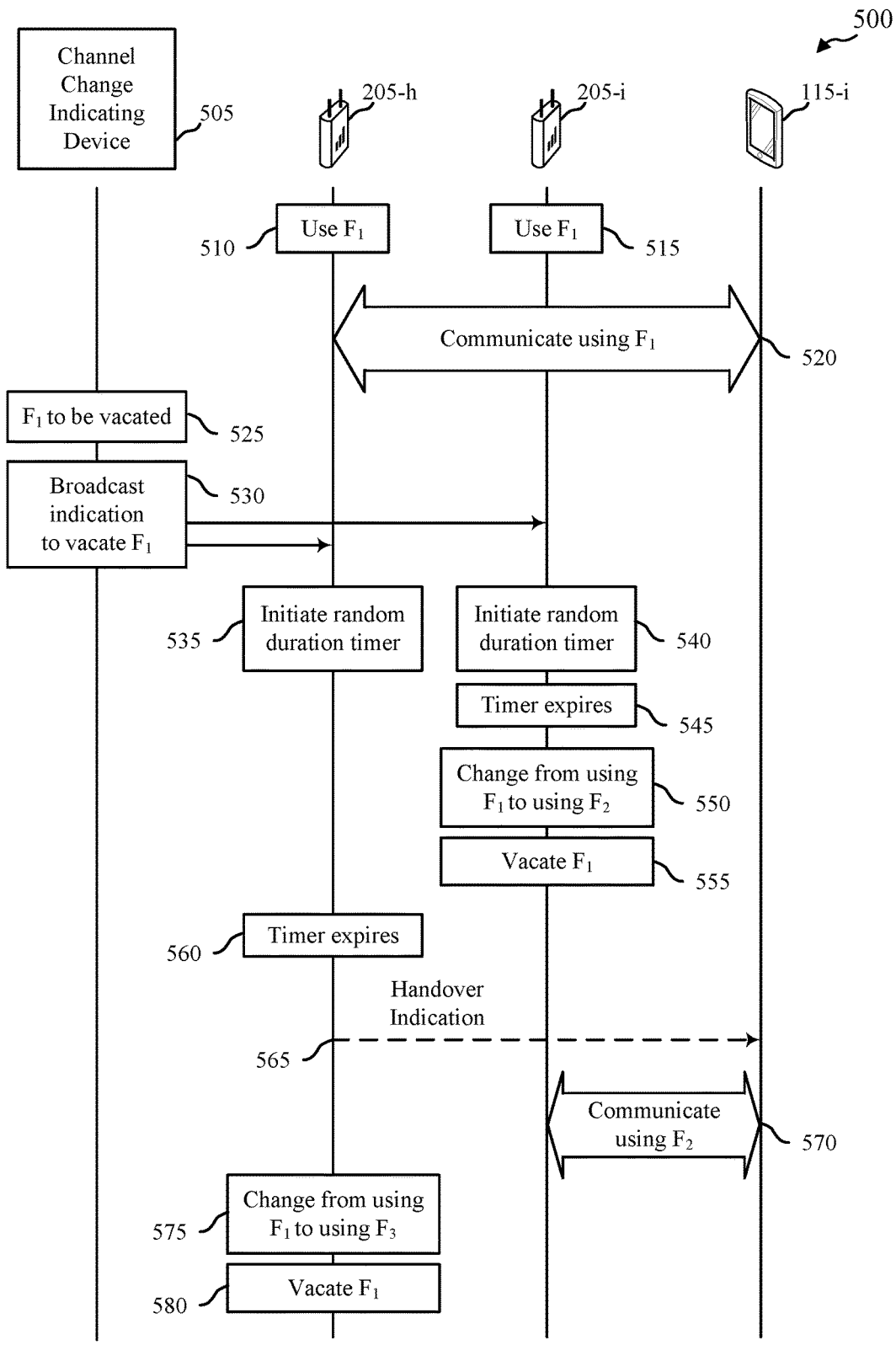
FIGS. 5 and 6 illustrate examples of communications procedures that support randomly-timed channel changing for cells of spectrum sharing networks in accordance with aspects of the present disclosure.

FIG. 5 illustrates an example of a communications procedure 500 that supports randomly-timed channel changing for cells of spectrum sharing networks in accordance with aspects of the present disclosure. The communications procedure 500 may include messaging and operations performed by and/or between a channel change indicating device 505, a first cell 205-h, a second cell 205-i, and a UE 115-i that may be located within a coverage area 210 of both the first cell 205-h and the second cell 205-i. In various examples the channel change indicating device 505 may be a higher-tier user, a SAS, or some other device that may transmit indications to vacate a frequency channel of a spectrum sharing network as described herein.

At 510, the first cell 205-h may be configured to use a first frequency channel $F_1$, and at 515 the second cell 205-i may be configured to use the first frequency channel $F_1$. In other words, both the first cell 205-h and the second cell 205-i may be configured to serve various user devices on the same frequency channel (although one or both of the first cell 205-h or second cell 205-i may support using additional frequency channels as well). At 520, the UE 115-i may communicate with the first cell 205-h using the first frequency channel $F_1$.

At 525, the channel change indicating device 505 may identify that the first frequency channel $F_1$ is to be vacated. For example, as described herein, the channel change indicating device 505 may receive an indication from a higher-tier user, determine that a higher-tier user is moving towards the cells 205-h and 205-i, determined that a higher-tier user is initiating a service that requires dedicated access to the first frequency channel $F_1$, etc. In other examples, the channel change indicating device 505 may be a higher-tier device, and may determine that the first frequency channel $F_1$ based on services or operations at the channel change indicating device.

At 530, the channel change indicating device may broadcast an indication that the first frequency channel $F_1$ is to be vacated, and the broadcast indication may be received at both the first cell 205-h and the second cell 205-i. Consequently, the first cell 205-h may initiate a timer having random duration at 535, and the second cell 205-i may initiate a timer having a random duration at 540. According to the example of communications procedure 500, the duration of the timer determined at the second cell 205-i may be shorter than the duration of the timer determined at the first cell 205-h At 545, the timer of the second cell 205-i may expire. Although not shown, the second cell may transmit a handover indication to user devices being served by the second cell 205-i. At 550, the second cell 205-i may change from using the first frequency channel $F_1$ to using a second frequency channel $F_2$. In some examples the second cell 205-i may have already been using the second frequency channel $F_2$, and at 550 the second cell 205-i may simply move operations associated with the first frequency channel $F_1$ to the second frequency channel $F_2$. In other examples (e.g., when the second cell 205-i supports using a single frequency channel at a time, or otherwise uses one frequency channel at a time), the second cell 205-i may cease using the first frequency channel $F_1$, reconfigure a radio device (e.g., a transmitter, a receiver, a transceiver, etc.) to support using the second frequency channel $F_2$, and proceed with using the second frequency channel $F_2$. Consequently, at 555 the second cell 205-i may vacate the first frequency channel $F_1$.

At 560, the timer of the first cell 205-h may expire. Subsequently, the first cell 205-h may transmit a handover indication to user devices being served by the first cell 205-h (e.g., UE 115-i) at 565. Following the handover indication of 565 being received by the UE 115-i, the UE 115-i may perform a handover procedure, which may be performed according to one or more parameters received in the handover indication(s) (e.g., an indication to hand over to the second cell 205-i, an indication to use the second frequency channel $F_2$, etc.). Subsequently, the UE 115-i may communicate with the second cell 205-i using the second frequency channel $F_2$ at 570.

At 575, the first cell 205-h may change from using the first frequency channel $F_1$ to using a third frequency channel $F_3$, according to any of the operations described herein, which may be the same or different from those procedures performed by the second cell 205-i at 550. Moreover, the third frequency channel $F_3$ may be the same as, of different from the second frequency channel $F_3$. Consequently, at 580 the first cell 205-i may vacate the first frequency channel $F_1$.

Thus, as described with reference to the communications procedure 500, the UE 115-i may be handed over to the second cell 205-i in a manner that follows the changing of the second cell 205-i from using the first channel first frequency channel $F_1$ to using the second frequency channel $F_2$. By staggering the channel changes according to the random duration timers of communications procedure 500, the UE 115-i may be more likely to avoid service disruptions that may be associated with communicating with, or attempting to access a cell that is undergoing a channel change procedure, without using a coordinating device to explicitly stagger such channel changes.

Figure 6:
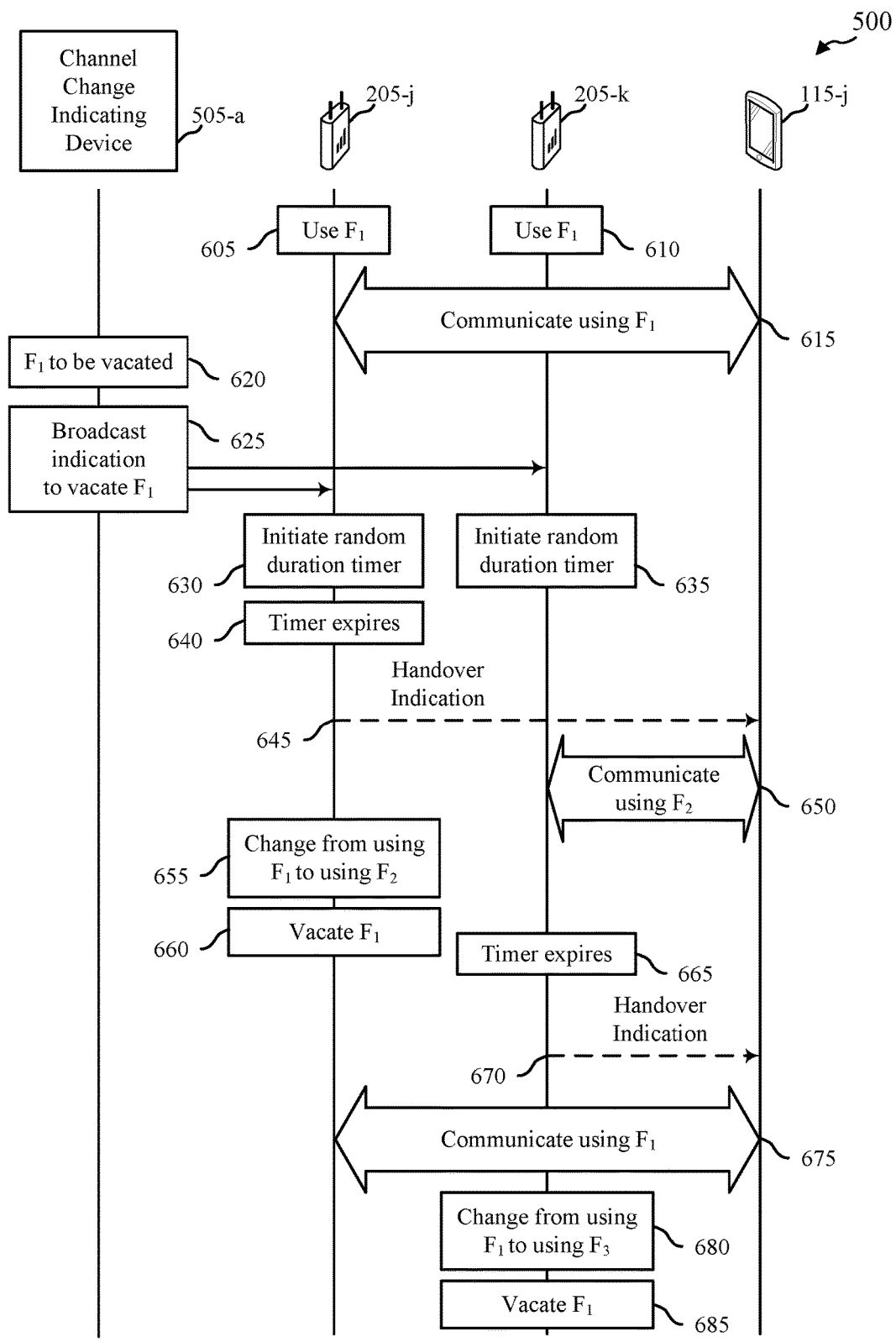

FIG. 6 illustrates another example of a communications procedure 600 that supports randomly-timed channel changing for cells of spectrum sharing networks in accordance with aspects of the present disclosure. The communications procedure 600 may include messaging and operations performed by and/or between a channel change indicating device 505-a, a first cell 205-j, a second cell 205-k, and a UE 115-j that may be located within a coverage area 210 of both the first cell 205-j and the second cell 205-k. In various examples the channel change indicating device 505-a may be a higher-tier user, a SAS, or some other device that may transmit indications to vacate a frequency channel of a spectrum sharing network as described herein.

At 605, the first cell **205-*j* may be configured to use a first frequency channel $F_1$, and at 610 the second cell 205-*k* may be configured to use the first frequency channel $F_1$. In other words, both the first cell 205-*j* and the second cell 205-*k* may be configured to serve various user devices on the same frequency channel. In other examples, one or both of the first cell 205-*j* or second cell 205-*k* may support using additional frequency channels as well. At 615, the UE 115-*j* may communicate with the first cell 205-*j*** using the first frequency channel $F_1$.

At 620, the channel change indicating device **505-*a* may identify that the first frequency channel $F_1$ is to be vacated. For example, as described herein, the channel change indicating device 505-*a* may receive an indication from a higher-tier user, determine that a higher-tier user is moving towards the cells 205-*j* and 205-*k*, determine that a higher-tier user is initiating a service that requires dedicated access to the first frequency channel $F_1$, etc. In other examples, the channel change indicating device 505-*a*** may be a higher-tier device, and may determine that the first frequency channel $F_1$ based on services or operations at the channel change indicating device.

At 625, the channel change indicating device may broadcast an indication that the first frequency channel $F_1$ is to be vacated, and the broadcast indication may be received at both the first cell **205-*j* and the second cell 205-*k*. Consequently, the first cell 205-*j* may initiate a timer having random duration at 630, and the second cell 205-*k* may initiate a timer having a random duration at 635. According to the example of communications procedure 600, the duration of the timer determined at the first cell 205-*j* may be shorter than the duration of the timer determined at the second cell 205-*k***.

At 640, the timer of the first cell **205-*j* may expire. Subsequently, the first cell 205-*j* may transmit a handover indication to user devices being served by the first cell 205-*j* (e.g., UE 115-*j*) at 645. Following the handover indication of 645 being received by the UE 115-*j*, the UE 115-*j* may perform a handover procedure, which may be performed according to one or more parameters received in the handover indication(s) (e.g., an indication to hand over to the second cell 205-*k*, an indication to use the second frequency channel $F_2$, etc.). Subsequently, the UE 115-*j* may communicate with the second cell 205-*k* using the second frequency channel $F_2$ at 650**.

At 655, the first cell **205-*j* may change from using the first frequency channel $F_1$ to using a second frequency channel $F_2$. In some examples the first cell 205-*j* may have already been using the second frequency channel $F_2$, and at 655 the first cell 205-*j* may simply move operations associated with the first frequency channel $F_1$ to the second frequency channel $F_2$. In other examples (e.g., when the first cell 205-*j* supports using a single frequency channel at a time, or otherwise uses one frequency channel at a time), the first cell 205-*j* may cease using the first frequency channel $F_1$, reconfigure a radio device (e.g., a transmitter, a receiver, a transceiver, etc.) to support using the second frequency channel $F_2$, and proceed with using the second frequency channel $F_2$. Consequently, at 660 the first cell 205-*j*** may vacate the first frequency channel $F_1$.

At 665, the timer of the second cell **205-*k* may expire. Subsequently, the second cell 205-*k* may transmit a handover indication to user devices being served by the first cell 205-*k* (e.g., UE 115-*j*) at 670. Following the handover indication of 670 being received by the UE 115-*j*, the UE 115-*j* may perform a handover procedure, which may be performed according to one or more parameters received in the handover indication(s) (e.g., an indication to hand over to the first cell 205-*j*, an indication to use the second frequency channel $F_2$, etc.). The UE 115-*j* may then return to communicating with the first cell 205-*j* at 675, but using the second frequency channel $F_2$. Although the communications procedure 600 shows the UE 115-*j* returning to communications with the first cell 205-*j*, in other examples UE 115-*j*** may be handed over to a third cell (not shown) according to any of the procedures described herein.

At 680, the second cell **205-*k* may change from using the first frequency channel $F_1$ to using a third frequency channel $F_3$, according to any of the operations described herein, which may be the same or different from those procedures performed by the first cell 205-*j* at 655. Moreover, the third frequency channel $F_3$ may be the same as, of different from the second frequency channel $F_2$. Consequently, at 585 the second cell 205-*k*** may vacate the first frequency channel $F_1$.

Thus, as described with reference to the communications procedure 600, the UE **115-*j* may be handed over to the second cell 205-*k* before a channel change procedure of the second cell 205-*k*, and handed back to the first cell 205-*j* after a channel change procedure of the first cell 205-*j*. By staggering the channel changes according to the random duration timers of communications procedure 600, the UE 115-*j*** may be more likely to avoid service disruptions that may be associated with communicating with, or attempting to access a cell that is undergoing a channel change procedure, while avoiding a need for a coordinating device to explicitly stagger such channel changes.

Figure 7:
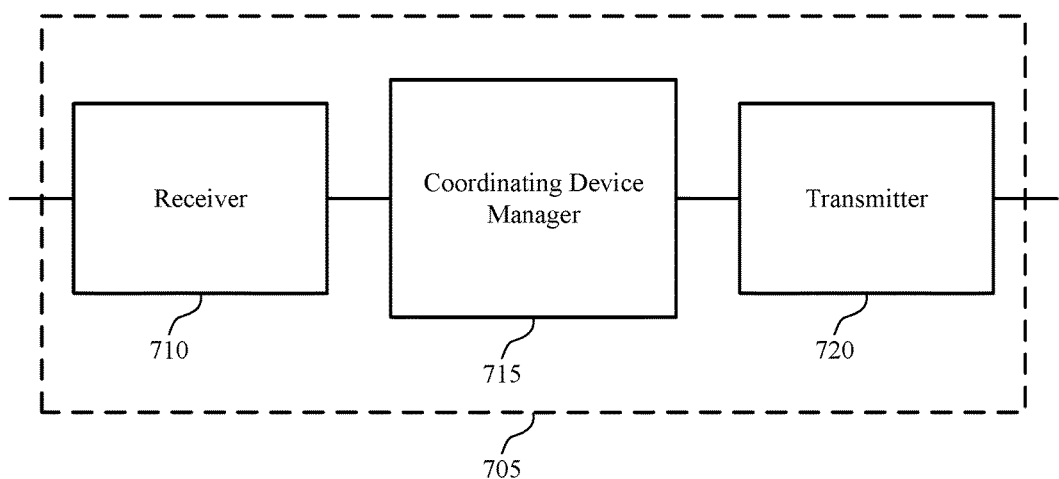
FIGS. 7 through 9 show diagrams of a device that supports staggered channel changing for cells of spectrum sharing networks in accordance with aspects of the present disclosure.

FIG. 7 shows a diagram 700 of a wireless device 705 that supports staggered channel changing for cells of spectrum sharing networks in accordance with various aspects of the present disclosure. Wireless device 705 may be an example of aspects of a coordinating device 220 as described with reference to FIGS. 2 through 4. Wireless device 705 may include receiver 710, coordinating device manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to staggered channel changing for cells of spectrum sharing networks, etc.). Information may be passed on to other components of the device. The receiver 710 may be an example of aspects of the transceiver 1035 described with reference to FIG. 10.

Coordinating device manager 715 may receive (e.g., in cooperation with the receiver 710) an indication that a frequency channel is to be vacated, identify a set of cells of the spectrum sharing network that are using the frequency channel, determine a channel change order for the set of cells, and provide (e.g., in cooperation with the transmitter 720), to at least one cell of the set of cells, an indication of a channel change timing that is based on the determined channel change order. Coordinating device manager 715 may be an example of aspects of the coordinating device manager 1015 described with reference to FIG. 10.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
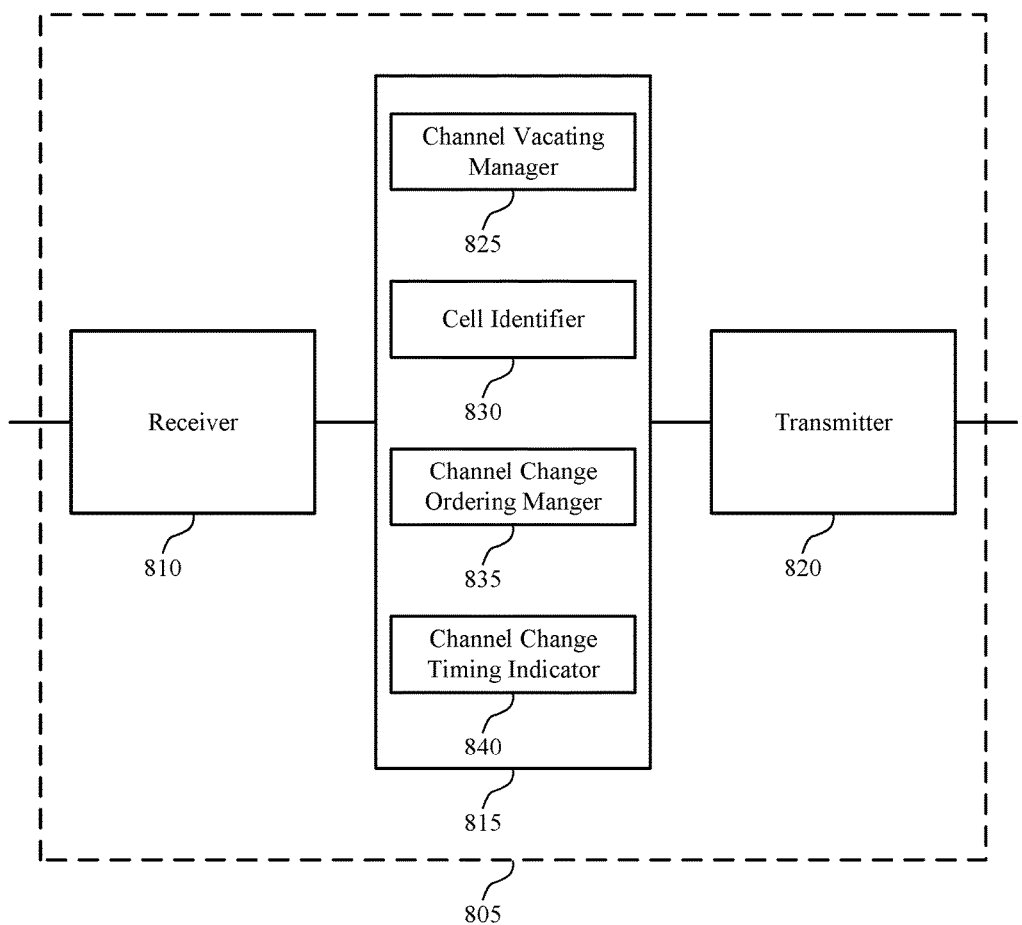

FIG. 8 shows a diagram 800 of a wireless device 805 that supports staggered channel changing for cells of spectrum sharing networks in accordance with various aspects of the present disclosure. Wireless device 805 may be an example of aspects of a wireless device 705 or a coordinating device 220 as described with reference to FIGS. 2 through 4 and 7. Wireless device 805 may include receiver 810, coordinating device manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to staggered channel changing for cells of spectrum sharing networks, etc.). Information may be passed on to other components of the device. The receiver 810 may be an example of aspects of the transceiver 1035 described with reference to FIG. 10.

Coordinating device manager 815 may be an example of aspects of the coordinating device manager 715 described with reference, or the coordinating device manager 1015 described with reference to FIG. 10. Coordinating device manager 815 may include channel vacating manager 825, cell identifier 830, channel change ordering manger 835, and channel change timing indicator 840.

Channel vacating manager 825 may receive (e.g., in cooperation with the receiver 810) an indication that a frequency channel is to be vacated. In some cases, the indication that the frequency channel is to be vacated may be received from a higher-tier user or a SAS.

Cell identifier 830 may identify a set of cells of the spectrum sharing network that are using the frequency channel. Channel change ordering manger 835 may determine a channel change order for the set of cells and determine the channel change order for the set of cells is based on a number of user devices associated with at least one cell of the set of cells, or a radio condition associated with the at least one cell, or a type of service for user devices associated with the at least one cell, or a combination thereof.

Channel change timing indicator 840 may provide (e.g., in cooperation with the transmitter 820), to at least one cell of the set of cells, an indication of a channel change timing that is based on the determined channel change order.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
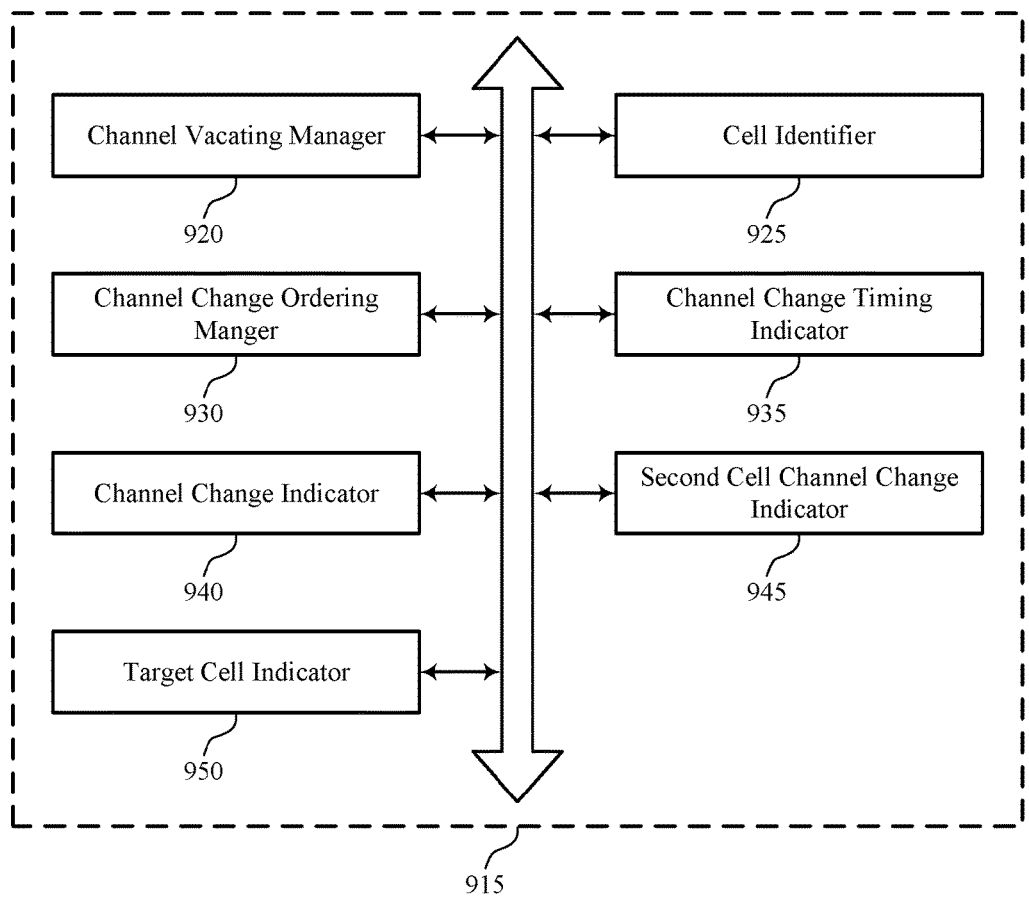

FIG. 9 shows a diagram 900 of a coordinating device manager 915 that supports staggered channel changing for cells of spectrum sharing networks in accordance with various aspects of the present disclosure. The coordinating device manager 915 may be an example of aspects of a coordinating device manager 715, a coordinating device manager 815, or a coordinating device manager 1015 described with reference to FIGS. 7, 8, and 10. The coordinating device manager 915 may include channel vacating manager 920, cell identifier 925, channel change ordering manger 930, channel change timing indicator 935, channel change indicator 940, second cell channel change indicator 945, and target cell indicator 950. Each of these modules may communicate, directly or indirectly, with one another (e.g., via one or more buses).

Channel vacating manager 920 may receive (e.g., in cooperation with a receiver), at the coordinating device, an indication that a frequency channel is to be vacated. In some cases, the indication that the frequency channel is to be vacated may be received from a higher-tier user or a SAS.

Cell identifier 925 may identify a set of cells of the spectrum sharing network that are using the frequency channel. Channel change ordering manger 930 may determine a channel change order for the set of cells and determine the channel change order for the set of cells is based on a number of user devices associated with at least one cell of the set of cells, or a radio condition associated with the at least one cell, or a type of service for user devices associated with the at least one cell, or a combination thereof.

Channel change timing indicator 935 may provide (e.g., in cooperation with a transmitter), to at least one cell of the set of cells, an indication of a channel change timing that is based on the determined channel change order. Channel change indicator 940 may provide (e.g., in cooperation with a transmitter), to a first cell of the at least one cell, an indication of a different frequency channel for the first cell to change to. Second cell channel change indicator 945 may provide (e.g., in cooperation with a transmitter), to a first cell of the at least one cell, an indication of a channel change timing for a second cell of the spectrum sharing network. Target cell indicator 950 may provide (e.g., in cooperation with a transmitter) an indication of a target cell to which a wireless device served by the at least one cell is to be handed over and provide an indication of the frequency channel of the target cell.

Figure 10:
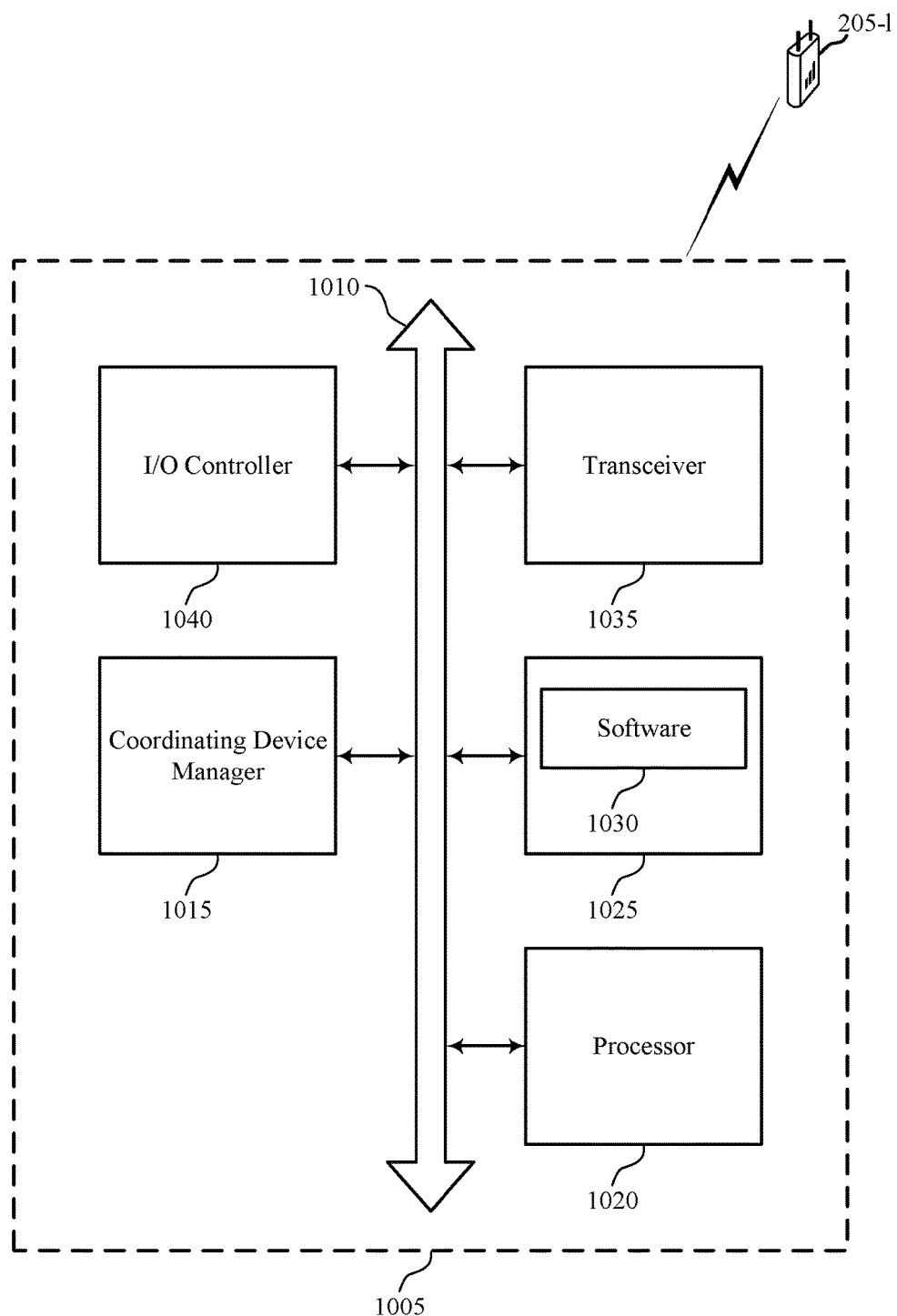
FIG. 10 illustrates a diagram of a system including a coordinating device that supports staggered channel changing for cells of spectrum sharing networks in accordance with aspects of the present disclosure.

FIG. 10 shows a diagram of a system 1000 including a device 1005 that supports staggered channel changing for cells of spectrum sharing networks in accordance with various aspects of the present disclosure. Device 1005 may be an example of or include the components of wireless device 705, wireless device 805, or a coordinating device 220 as described above, e.g., with reference to FIGS. 1, 7 and 8. Device 1005 may include components for bi-directional voice and data communications including components for transmitting and receiving communications, including coordinating device manager 1015, processor 1020, memory 1025, software 1030, transceiver 1035, and I/O controller 1040.

Processor 1020 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting staggered channel changing for cells of spectrum sharing networks) 1020.

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a Basic Input-Output system (BIOS) which may control basic hardware and/or software operation such as the interaction with peripheral components or devices.

Software 1030 may include code to implement aspects of the present disclosure, including code to support staggered channel changing for cells of spectrum sharing networks. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. The transceiver 1035 may be configured to communicate with one or more cells, such as the cell 205-1.

I/O controller 1040 may manage input and output signals for device 1005. I/O controller 1040 may also manage peripherals not integrated into device 1005. In some cases, I/O controller 1040 may represent a physical connection or port to an external peripheral. In some cases, I/O controller 1040 may utilize an operating system such as iOS®, ANDROID®, MS-DOS®, MS-WINDOWS®, OS/2®, UNIX®, LINUX®, or another known operating system.

Figure 11:
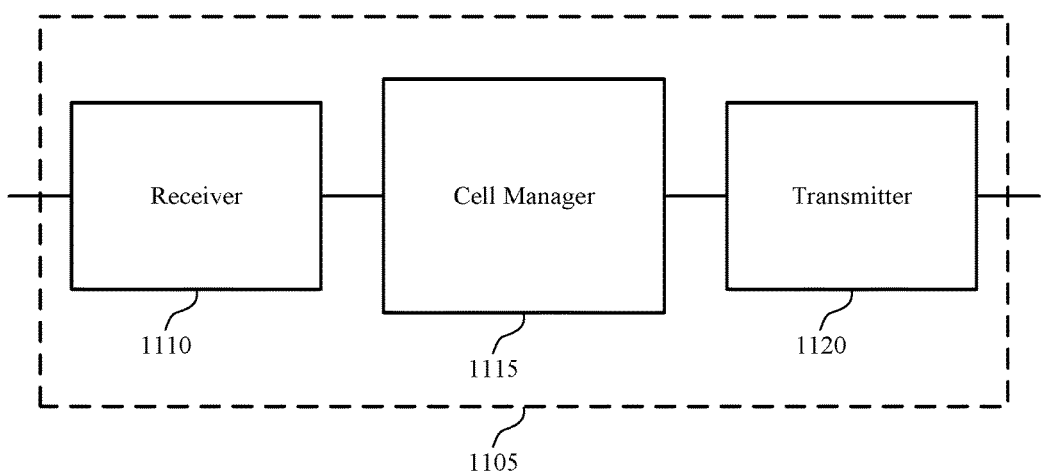
FIGS. 11 through 13 show diagrams of a device that supports staggered channel changing for cells of spectrum sharing networks in accordance with aspects of the present disclosure.

FIG. 11 shows a diagram 1100 of a wireless device 1105 that supports staggered channel changing for cells of spectrum sharing networks in accordance with various aspects of the present disclosure. Wireless device 1105 may be an example of aspects of a cell 205, a base station 105, or the like, as described with reference to FIGS. 1 through 6. Wireless device 1105 may include receiver 1110, cell manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to staggered channel changing for cells of spectrum sharing networks, etc.). Information may be passed on to other components of the device. The receiver 1110 may be an example of aspects of the transceiver 1435 described with reference to FIG. 14.

Cell manager 1115 may communicate (e.g., in cooperation with the receiver 1110 and/or the transmitter 1120) with one or more wireless devices served by the cell via a frequency channel of the spectrum sharing network, receive (e.g., in cooperation with the receiver 1110) an indication that the frequency channel is to be vacated, initiate a timer in response to receiving the indication, the timer set to a random duration, and transmit (e.g., in cooperation with the transmitter 1120), upon an expiration of the timer, a handover indication to the one or more wireless devices. Cell manager 1115 may be an example of aspects of the cell manager 1415 described with reference to FIG. 14.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Figure 12:
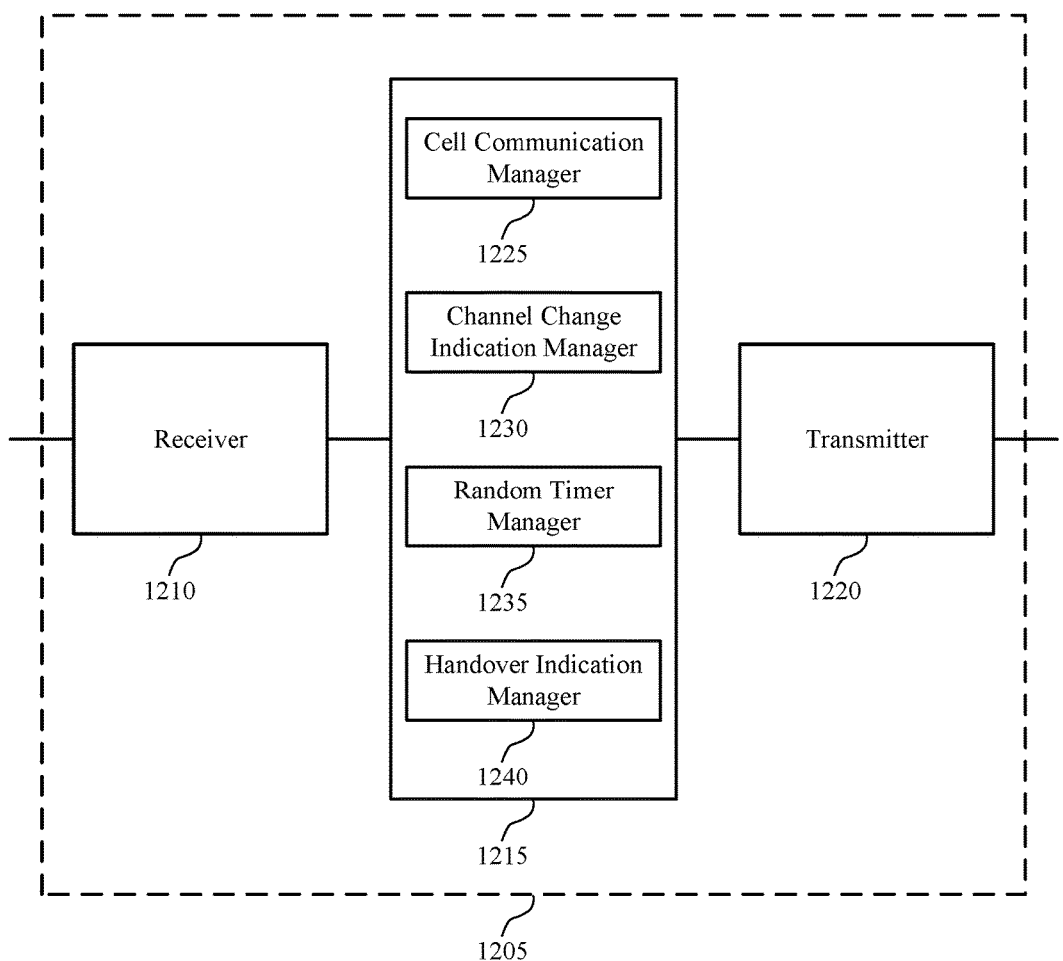

FIG. 12 shows a diagram 1200 of a Wireless device 1205 that supports staggered channel changing for cells of spectrum sharing networks in accordance with various aspects of the present disclosure. Wireless device 1205 may be an example of aspects of a wireless device 1105 as described with reference to FIGS. 1 and 11. Wireless device 1205 may include receiver 1210, cell manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to staggered channel changing for cells of spectrum sharing networks, etc.). Information may be passed on to other components of the device. The receiver 1210 may be an example of aspects of the transceiver 1435 described with reference to FIG. 14.

Cell manager 1215 may be an example of aspects of the cell manager 1115 described with reference to FIG. 11, or the cell manager 1415 described with reference to FIG. 14, and may include cell communication manager 1225, channel change indication manager 1230, random timer manager 1235, and handover indication manager 1240.

Cell communication manager 1225 may communicate (e.g., in cooperation with the receiver 1210 and/or the transmitter 1220) with one or more wireless devices served by the cell via a frequency channel of the spectrum sharing network. Channel change indication manager 1230 may receive (e.g., in cooperation with the receiver 1210) an indication that the frequency channel is to be vacated. In some cases, the indication that the frequency channel is to be vacated is received from a higher-tier user, a SAS, or another cell of the spectrum sharing network.

Random timer manager 1235 may initiate a timer, set to a random duration, in response to receiving an indication that a frequency channel is to be vacated. Handover indication manager 1240 may transmit (e.g., in cooperation with the transmitter 1220), upon an expiration of the timer, a handover indication to the one or more wireless devices which may include an indication of a different frequency channel, or a different cell, or a different RAT, or a combination thereof.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
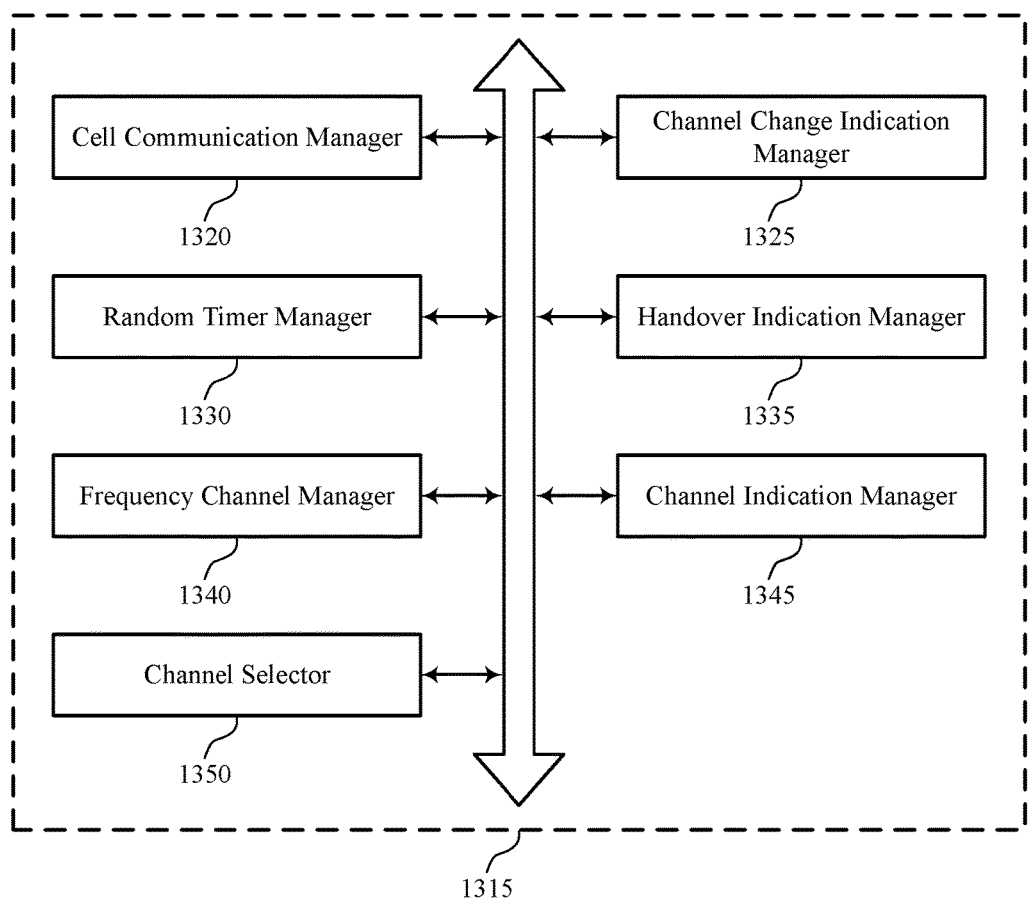

FIG. 13 shows a diagram 1300 of a cell manager 1315 that supports staggered channel changing for cells of spectrum sharing networks in accordance with various aspects of the present disclosure. The cell manager 1315 may be an example of aspects of a cell manager 1415 described with reference to FIGS. 11, 12, and 14. The cell manager 1315 may include cell communication manager 1320, channel change indication manager 1325, random timer manager 1330, handover indication manager 1335, frequency channel manager 1340, channel indication manager 1345, and channel selector 1350. Each of these modules may communicate, directly or indirectly, with one another (e.g., via one or more buses).

Cell communication manager 1320 may communicate (e.g., in cooperation with a transmitter and/or a receiver)

with one or more wireless devices served by the cell via a frequency channel of the spectrum sharing network.

Channel change indication manager 1325 may receive (e.g., in cooperation with a receiver) an indication that the frequency channel is to be vacated. In some cases, the indication that the frequency channel is to be vacated may be received from a higher-tier user, a SAS, or another cell of the spectrum sharing network.

Random timer manager 1330 may initiate a timer, set to a random duration, in response to receiving an indication to vacate a frequency channel. Handover indication manager 1335 may transmit (e.g., in cooperation with a transmitter), upon an expiration of the timer, a handover indication to the one or more wireless devices, which may include an indication of a different frequency channel, or a different cell, or a different RAT, or a combination thereof.

Frequency channel manager 1340 may vacate a frequency channel and change to a new frequency channel. Channel indication manager 1345 may receive an indication of a new frequency channel to which the cell is to change. Channel selector 1350 may select a new frequency channel to which to change from among a set of one or more frequency channels based on receiving the indication that the frequency channel is to be vacated. The channel selector 1350 may, for example make a selection of a next frequency channel in a sequence of frequency channels, make selection based on operational parameters or indications, or may make a random selection.

Figure 14:
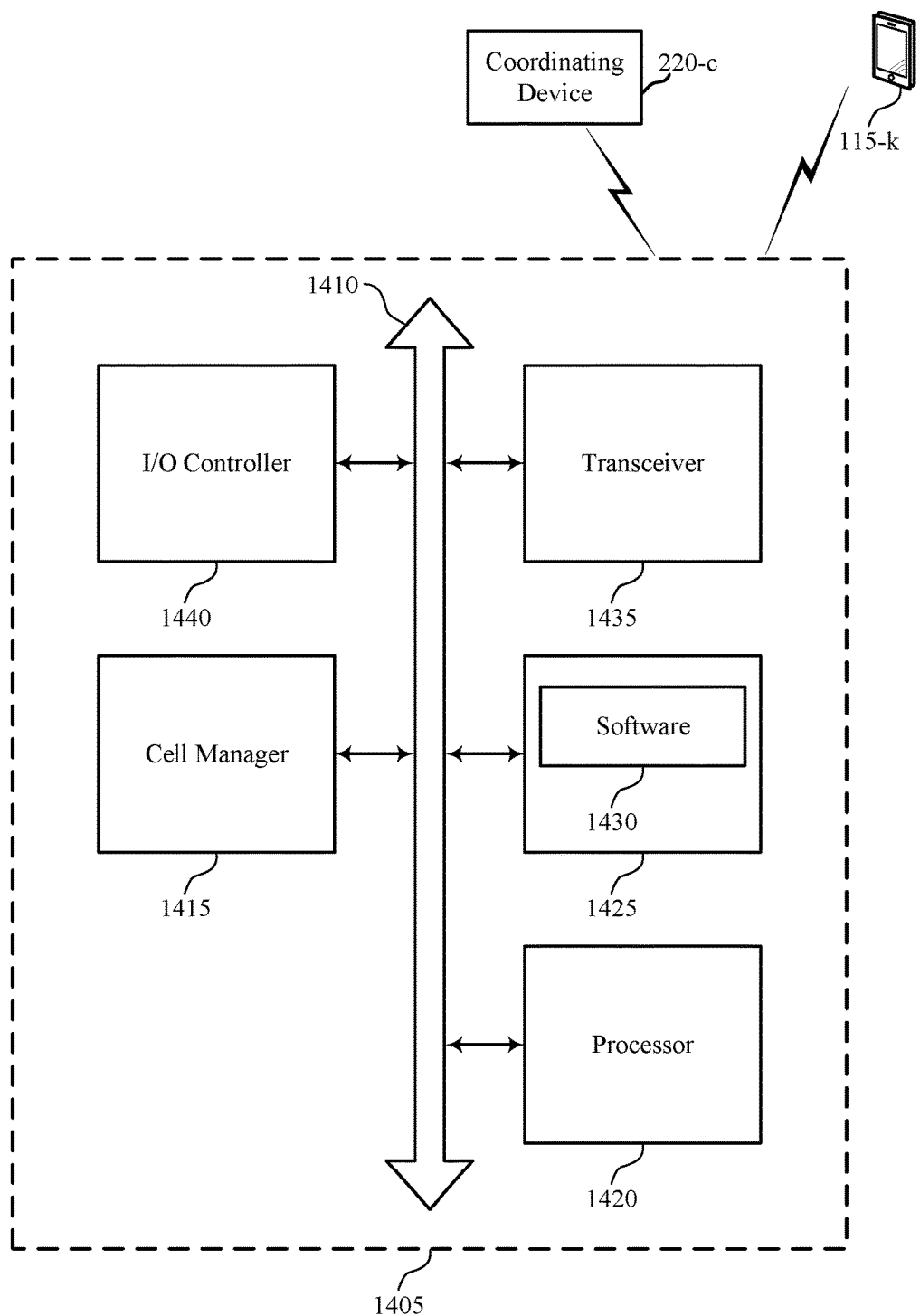
FIG. 14 illustrates a diagram of a system including a cell that supports staggered channel changing for cells of spectrum sharing networks in accordance with aspects of the present disclosure.

FIG. 14 shows a diagram of a system 1400 including a device 1405 that supports staggered channel changing for cells of spectrum sharing networks in accordance with various aspects of the present disclosure. Device 1405 may be an example of or include the components of cell 205, a base station 105, or the like, as described above, e.g., with reference to FIGS. 1 through 6. Device 1405 may include components for bi-directional voice and data communications including components for transmitting and receiving communications, including cell manager 1415, processor 1420, memory 1425, software 1430, transceiver 1435, and I/O controller 1440.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting staggered channel changing for cells of spectrum sharing networks). 1420.

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support staggered channel changing for cells of spectrum sharing networks. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. The transceiver 1435 may be configured to communicate with one or more user devices, such as the UE 115-$k$, and or a coordinating device, such as coordinating device 220-$c$.

I/O controller 1440 may manage input and output signals for device 1405. I/O controller 1440 may also manage peripherals not integrated into device 1405. In some cases, I/O controller 1440 may represent a physical connection or port to an external peripheral. In some cases, I/O controller 1440 may utilize an operating system such as iOS®, ANDROID®, MS-DOS®, MS-WINDOWS®, OS/2®, UNIX®, LINUX®, or another known operating system.

Figure 15:
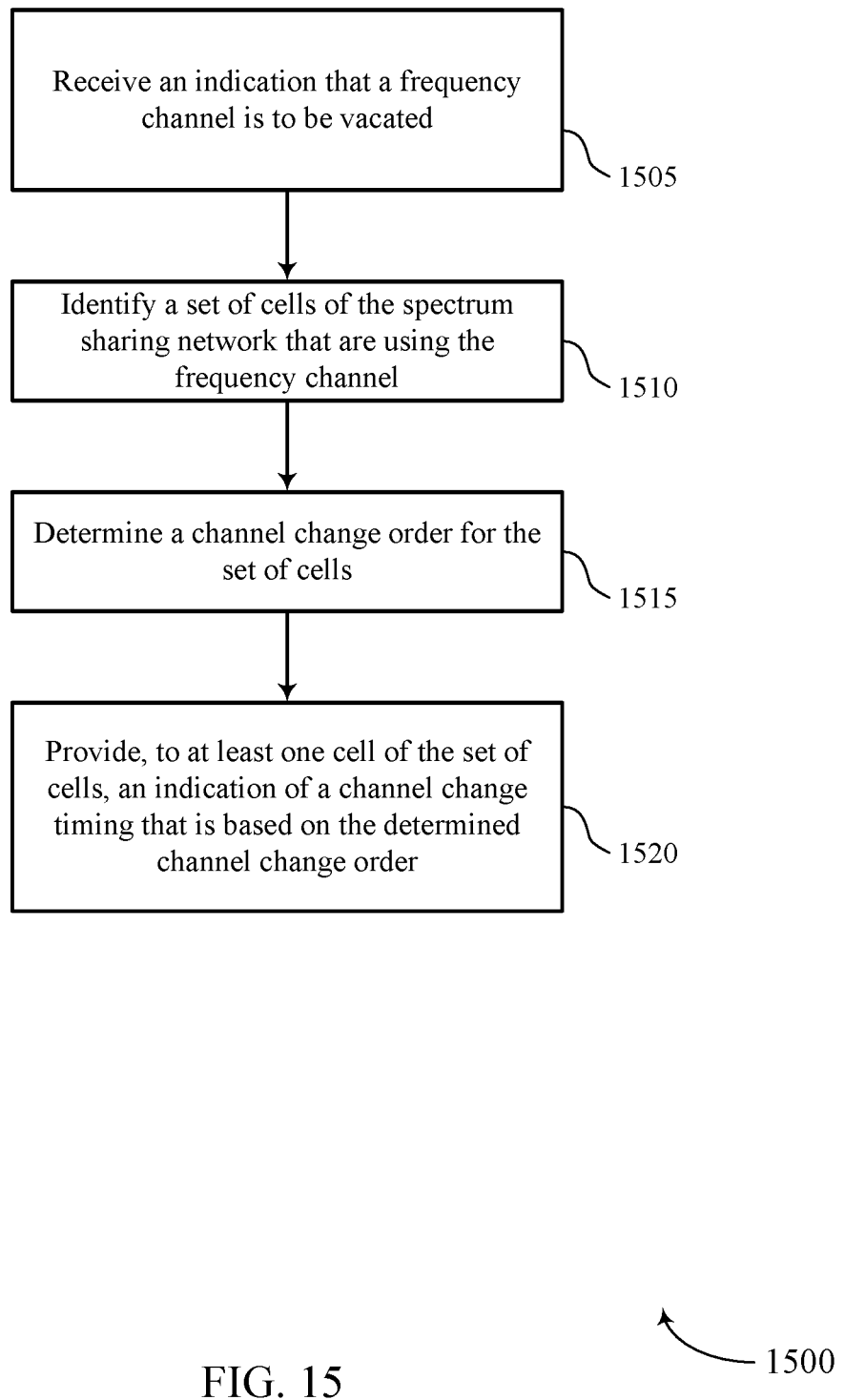
FIGS. 15 through 18 illustrate methods for staggered channel changing for cells of spectrum sharing networks in accordance with aspects of the present disclosure.

FIG. 15 shows a flowchart illustrating a method 1500 for staggered channel changing for cells of spectrum sharing networks in accordance with various aspects of the present disclosure. Operations of method 1500 may be implemented by a coordinating device 220 or its components as described herein with reference to FIGS. 1 through 4. For example, operations of method 1500 may be performed by a coordinating device manager as described with reference to FIGS. 7 through 10. In some examples, a coordinating device 220 may execute a set of instructions to control the functional elements of the device to perform the functions described below. Additionally or alternatively, the coordinating device 220 may perform aspects the functions described below using special-purpose hardware.

At block 1505 the coordinating device 220 may receive an indication that a frequency channel is to be vacated. Operations of block 1505 may be performed according to the methods described with reference to FIGS. 1 through 4. In some examples, aspects of the operations of block 1505 may be performed by a channel vacating manager (e.g., in cooperation with a receiver) as described with reference to FIGS. 7 through 10.

At block 1510 the coordinating device 220 may identify a plurality of cells of the spectrum sharing network that are using the frequency channel. Operations of block 1510 may be performed according to the methods described with reference to FIGS. 1 through 4. In some examples, aspects of the operations of block 1510 may be performed by a cell identifier as described with reference to FIGS. 7 through 10.

At block 1515 the coordinating device 220 may determine a channel change order for the plurality of cells. Operations of block 1515 may be performed according to the methods described with reference to FIGS. 1 through 4. In some examples, aspects of the operations of block 1515 may be performed by a channel change ordering manger as described with reference to FIGS. 7 through 10.

At block 1520 the coordinating device 220 may provide, to at least one cell of the plurality of cells, an indication of a channel change timing that is based at least in part on the determined channel change order. Operations of block 1520 may be performed according to the methods described with reference to FIGS. 1 through 4. In some examples, aspects of the operations of block 1520 may be performed by a channel change timing indicator (e.g., in cooperation with a transmitter) as described with reference to FIGS. 7 through 10.

Figure 16:
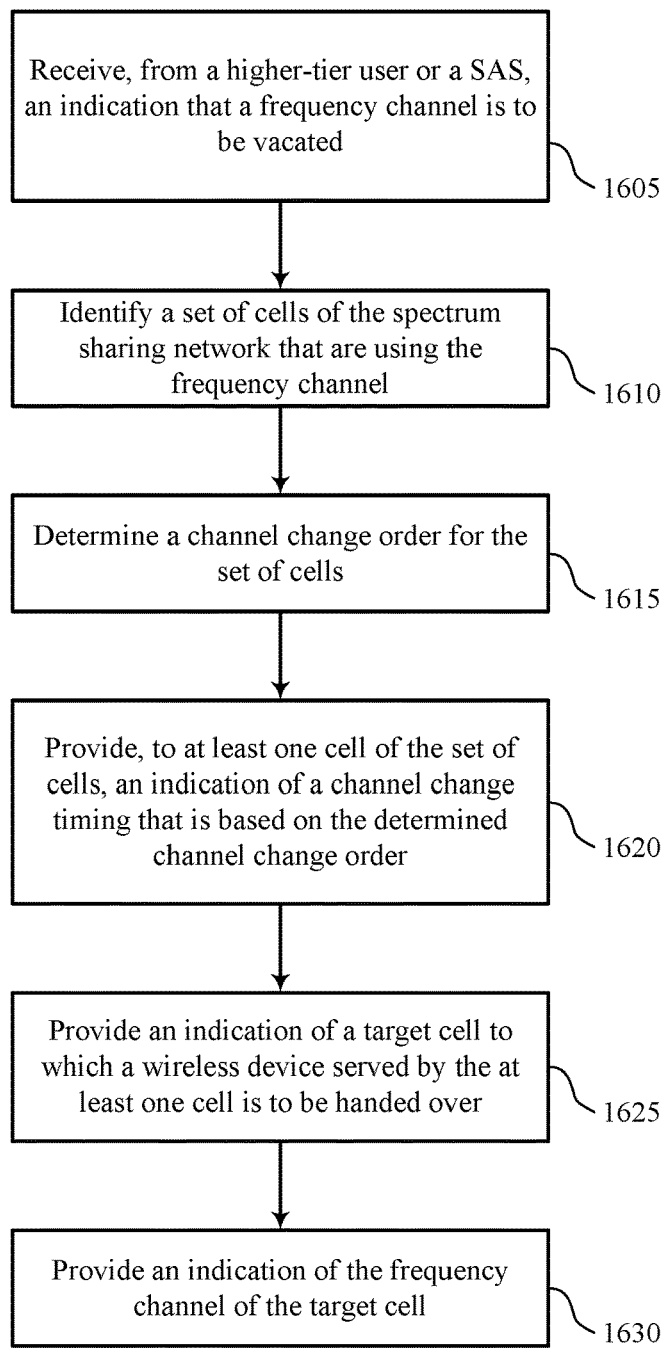

FIG. 16 shows a flowchart illustrating a method 1600 for staggered channel changing for cells of spectrum sharing networks in accordance with various aspects of the present disclosure. Operations of method 1600 may be implemented by a coordinating device 220 or its components as described herein. For example, operations of method 1600 may be performed by a coordinating device manager as described with reference to FIGS. 7 through 10. In some examples, a coordinating device 220 may execute a set of codes to control the functional elements of the device to perform the functions described below. Additionally or alternatively, the coordinating device 220 may perform aspects the functions described below using special-purpose hardware.

At block 1605 the coordinating device 220 may receive, from a higher-tier user or a SAS, an indication that a frequency channel is to be vacated. Operations of block 1605 may be performed according to the methods described with reference to FIGS. 1 through 4. In some examples, aspects of the operations of block 1605 may be performed by a channel vacating manager (e.g., in cooperation with a receiver) as described with reference to FIGS. 7 through 10.

At block 1610 the coordinating device 220 may identify a plurality of cells of the spectrum sharing network that are using the frequency channel. Operations of block 1610 may be performed according to the methods described with reference to FIGS. 1 through 4. In some examples, aspects of the operations of block 1610 may be performed by a cell identifier as described with reference to FIGS. 7 through 10.

At block 1615 the coordinating device 220 may determine a channel change order for the plurality of cells. Operations of block 1615 may be performed according to the methods described with reference to FIGS. 1 through 4. In some examples, aspects of the operations of block 1615 may be performed by a channel change ordering manger as described with reference to FIGS. 7 through 10.

At block 1620 the coordinating device 220 may provide, to at least one cell of the plurality of cells, an indication of a channel change timing that is based at least in part on the determined channel change order. Operations of block 1620 may be performed according to the methods described with reference to FIGS. 1 through 4. In some examples, aspects of the operations of block 1620 may be performed by a channel change timing indicator (e.g., in cooperation with a transmitter) as described with reference to FIGS. 7 through 10.

At block 1625 the coordinating device 220 may provide an indication of a target cell to which a wireless device served by the at least one cell is to be handed over. Operations of block 1625 may be performed according to the methods described with reference to FIGS. 1 through 4. In some examples, aspects of the operations of block 1625 may be performed by a target cell indicator (e.g., in cooperation with a transmitter) as described with reference to FIGS. 7 through 10.

At block 1630 the coordinating device 220 may provide an indication of the frequency channel of the target cell. Operations of block 1630 may be performed according to the methods described with reference to FIGS. 1 through 4. In some examples, aspects of the operations of block 1630 may be performed by a target cell indicator (e.g., in cooperation with a transmitter) as described with reference to FIGS. 7 through 10.

Figure 17:
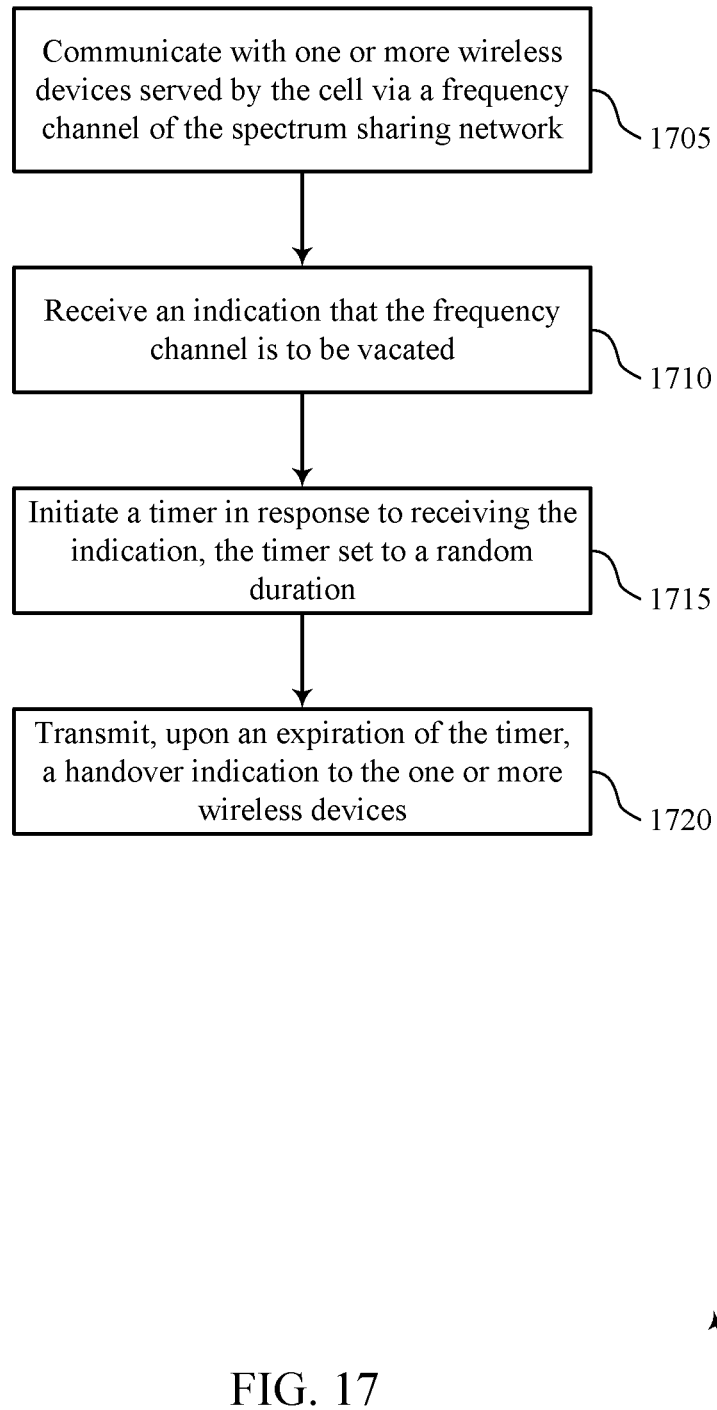

FIG. 17 shows a flowchart illustrating a method 1700 for staggered channel changing for cells of spectrum sharing networks in accordance with various aspects of the present disclosure. Operations of method 1700 may be implemented by a cell 205, a base station 105, or their components as described herein. For example, operations of method 1700 may be performed by a cell manager as described with reference to FIGS. 11 through 14. In some examples, a cell 205 may execute a set of codes to control the functional elements of the device to perform the functions described below. Additionally or alternatively, the cell 205 may perform aspects the functions described below using special-purpose hardware.

At block 1705 the cell 205 may communicate with one or more wireless devices served by the cell via a frequency channel of the spectrum sharing network. Operations of block 1705 may be performed according to the methods described with reference to FIGS. 1, 2, 5, and 6. In some examples, aspects of the operations of block 1705 may be performed by a cell communication manager (e.g., in cooperation with a transmitter and/or receiver) as described with reference to FIGS. 11 through 14.

At block 1710 the cell 205 may receive an indication that the frequency channel is to be vacated. Operations of block 1710 may be performed according to the methods described with reference to FIGS. 1, 2, 5, and 6. In some examples, aspects of the operations of block 1710 may be performed by a channel change indication manager (e.g., in cooperation with a receiver) as described with reference to FIGS. 11 through 14.

At block 1715 the cell 205 may initiate a timer in response to receiving the indication, the timer set to a random duration. Operations of block 1715 may be performed according to the methods described with reference to FIGS. 1, 2, 5, and 6. In some examples, aspects of the operations of block 1715 may be performed by a random timer manager as described with reference to FIGS. 11 through 14.

At block 1720 the cell 205 may transmit, upon an expiration of the timer, a handover indication to the one or more wireless devices. Operations of block 1720 may be performed according to the methods described with reference to FIGS. 1, 2, 5, and 6. In some examples, aspects of the operations of block 1720 may be performed by a handover indication manager (e.g., in cooperation with a transmitter) as described with reference to FIGS. 11 through 14.

Figure 18:
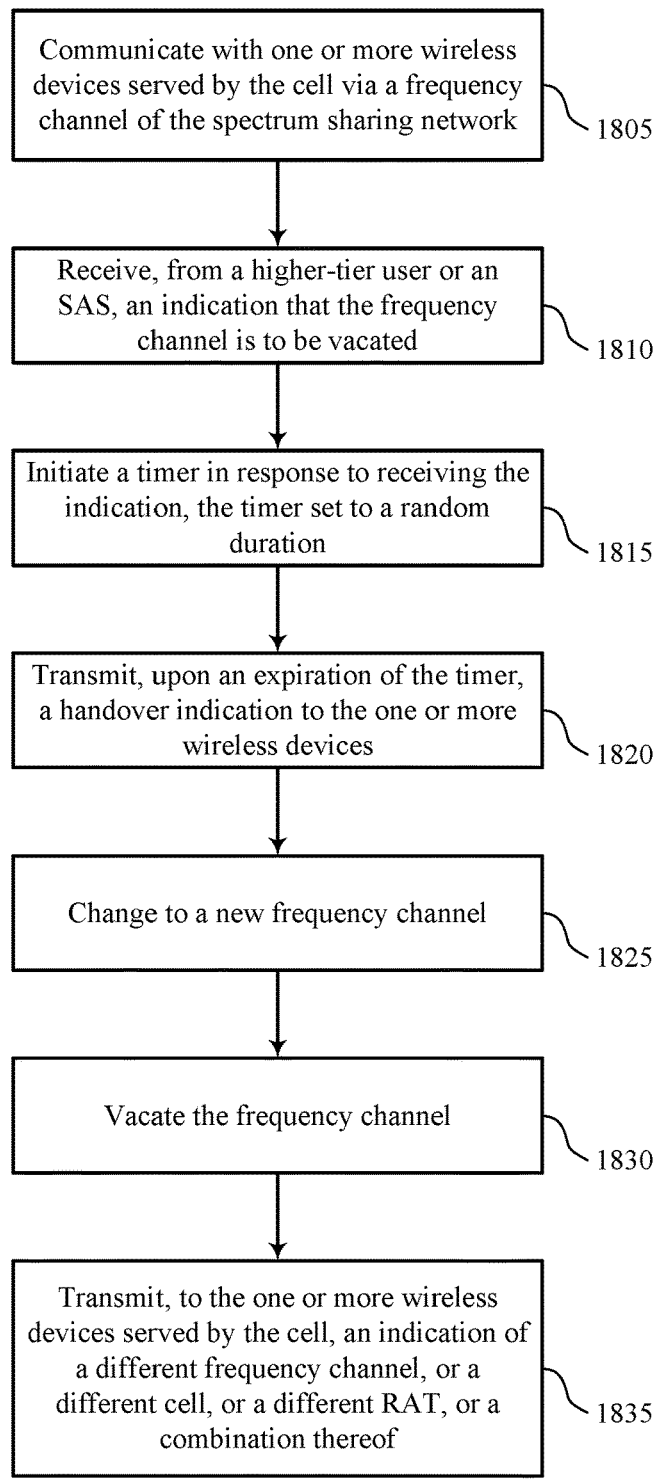

FIG. 18 shows a flowchart illustrating a method 1800 for staggered channel changing for cells of spectrum sharing networks in accordance with various aspects of the present disclosure. Operations of method 1800 may be implemented by a cell 205 or its components as described herein. For example, operations of method 1800 may be performed by a cell manager as described with reference to FIGS. 11 through 14. In some examples, a cell 205 may execute a set of codes to control the functional elements of the device to perform the functions described below. Additionally or alternatively, the cell 205 may perform aspects the functions described below using special-purpose hardware.

At block 1805 the cell 205 may communicate with one or more wireless devices served by the cell via a frequency channel of the spectrum sharing network. Operations of block 1805 may be performed according to the methods described with reference to FIGS. 1, 2, 5, and 6. In some examples, aspects of the operations of block 1805 may be performed by a cell communication manager as described with reference to FIGS. 11 through 14.

At block 1810 the cell 205 may receive, from a higher-tier user or a SAS, an indication that the frequency channel is to be vacated. Operations of block 1810 may be performed according to the methods described with reference to FIGS.

1, 2, 5, and 6. In some examples, aspects of the operations of block 1810 may be performed by a channel change indication manager (e.g., in cooperation with a receiver) as described with reference to FIGS. 11 through 14.

At block 1815 the cell 205 may initiate a timer in response to receiving the indication, the timer set to a random duration. Operations of block 1815 may be performed according to the methods described with reference to FIGS. 1, 2, 5, and 6. In some examples, aspects of the operations of block 1815 may be performed by a random timer manager as described with reference to FIGS. 11 through 14.

At block 1820 the cell 205 may transmit, upon an expiration of the timer, a handover indication to the one or more wireless devices. Operations of block 1820 may be performed according to the methods described with reference to FIGS. 1, 2, 5, and 6. In some examples, aspects of the operations of block 1820 may be performed by a handover indication manager (e.g., in cooperation with a transmitter) as described with reference to FIGS. 11 through 14.

At block 1825 the cell 205 may change to a new frequency channel. The operations of block 1825 may be performed according to the methods described with reference to FIGS. 1, 2, 5, and 6. In some examples, aspects of the operations of block 1825 may be performed by a frequency channel manager as described with reference to FIGS. 11 through 14.

At block 1830 the cell 205 may vacate the frequency channel. Operations of block 1830 may be performed according to the methods described with reference to FIGS. 1, 2, 5, and 6. In some examples, aspects of the operations of block 1825 may be performed by a frequency channel manager as described with reference to FIGS. 11 through 14.

At block 1835 the cell 205 may transmit, to the one or more wireless devices served by the cell, an indication of a different frequency channel, or a different cell, or a different RAT, or a combination thereof. Operations of block 1835 may be performed according to the methods described with reference to FIGS. 1, 2, 5, and 6. In some examples, aspects of the operations of block 1835 may be performed by a handover indication manager (e.g., in cooperation with a transmitter) as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, an eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and spectrum sharing network 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram or block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a coordinating device of a spectrum sharing network, comprising:
receiving, at the coordinating device, an indication that a frequency channel is to be vacated;
identifying, at the coordinating device, a plurality of cells of the spectrum sharing network that are using the frequency channel and are to vacate the frequency channel based at least in part on the received indication;
determining, at the coordinating device, in response to receiving the indication that the frequency channel is to be vacated, an order in which the identified plurality of cells that are using the frequency channel are to change channels to vacate the frequency channel, wherein the order is determined based at least in part on a number of user devices associated with one or more cells of the plurality of cells, or a radio condition associated with the one or more cells, or a type of service for user devices associated with the one or more cells, or a combination thereof; and
providing, by the coordinating device, to at least one cell of the identified plurality of cells, an indication of a channel change timing that is based at least in part on the order determined in response to receiving the indication that the frequency channel is to be vacated.

2. The method of claim 1, further comprising:
providing, to a first cell of the at least one cell, an indication of a different frequency channel for the first cell to change to.

3. The method of claim 1, further comprising:
providing, to a first cell of the at least one cell, an indication of a channel change timing for a second cell of the spectrum sharing network.

4. The method of claim 1, further comprising:
providing an indication of a target cell to which a wireless device served by the at least one cell is to be handed over.

5. The method of claim 4, further comprising:
providing an indication of the frequency channel of the target cell.

6. The method of claim 1, wherein the coordinating device is a cell of the spectrum sharing network.

7. The method of claim 1, wherein the indication that the frequency channel is to be vacated is received from a higher-tier user or a spectrum access system (SAS).

8. The method of claim 1, further comprising:
providing, by the coordinating device, for at least one user equipment (UE) served by a cell of the identified plurality of cells, a handover indication for the UE to transition to a different cell of the identified plurality of cells, the handover indication determined based at least in part on the order determined in response to receiving the indication that the frequency channel is to be vacated.

9. An apparatus for wireless communication at a coordinating device of a spectrum sharing network, comprising:
a processor;
memory in electronic communication with the processor; and
instructions stored in the memory and operable, when executed by the processor, to cause the apparatus to:
receive, at the coordinating device, an indication that a frequency channel is to be vacated;
identify, at the coordinating device, a plurality of cells of the spectrum sharing network that are using the frequency channel and are to vacate the frequency channel based at least in part on the received indication;
determine, at the coordinating device, in response to receiving the indication that the frequency channel is to be vacated, an order in which the identified plurality of cells that are using the frequency channel are to change channels to vacate the frequency channel, wherein the order is determined based at least in part on a number of user devices associated with one or more cells of the plurality of cells, or a radio condition associated with the one or more cells, or a type of service for user devices associated with the one or more cells, or a combination thereof; and
provide, by the coordinating device, to at least one cell of the identified plurality of cells, an indication of a channel change timing that is based at least in part on the order determined in response to receiving the indication that the frequency channel is to be vacated.

10. The apparatus of claim 9, wherein the instructions are operable, when executed by the processor, to cause the apparatus to:
provide, to a first cell of the at least one cell, an indication of a different frequency channel for the first cell to change to.

11. The apparatus of claim 9, wherein the instructions are operable, when executed by the processor, to cause the apparatus to:
provide, to a first cell of the at least one cell, an indication of a channel change timing for a second cell of the spectrum sharing network.

12. The apparatus of claim 9, wherein the instructions are operable, when executed by the processor, to cause the apparatus to:
provide an indication of a target cell to which a wireless device served by the at least one cell is to be handed over.

13. The apparatus of claim 12, wherein the instructions are operable, when executed by the processor, to cause the apparatus to:
provide an indication of the frequency channel of the target cell.

14. The apparatus of claim 9, wherein the coordinating device is a cell of the spectrum sharing network.

15. The apparatus of claim 9, wherein the indication that the frequency channel is to be vacated is received from a higher-tier user or a spectrum access system (SAS).

16. The apparatus of claim 9, wherein the instructions are operable, when executed by the processor, to cause the apparatus to:
provide, by the coordinating device, for at least one user equipment (UE) served by a cell of the identified plurality of cells, a handover indication for the UE to transition to a different cell of the identified plurality of cells, the handover indication determined based at least in part on the order determined in response to receiving the indication that the frequency channel is to be vacated.

17. An apparatus for wireless communication at a coordinating device of a spectrum sharing network, the apparatus comprising:

means for receiving, at the coordinating device, an indication that a frequency channel is to be vacated;

means for identifying, at the coordinating device, a plurality of cells of the spectrum sharing network that are using the frequency channel and are to vacate the frequency channel based at least in part on the received indication;

means for determining, in response to receiving the indication that the frequency channel is to be vacated, an order in which the identified plurality of cells that are using the frequency channel are to change channels to vacate the frequency channel, wherein the order is determined based at least in part on a number of user devices associated with one or more cells of the plurality of cells, or a radio condition associated with the one or more cells, or a type of service for user devices associated with the one or more cells, or a combination thereof; and means for providing, by the coordinating device, to at least one cell of the identified plurality of cells, an indication of a channel change timing that is based at least in part on the order determined in response to receiving the indication that the frequency channel is to be vacated.

18. The apparatus of claim 17, further comprising:
means for providing, to a first cell of the at least one cell, an indication of a different frequency channel for the first cell to change to.

19. The apparatus of claim 17, further comprising:
means for providing, to a first cell of the at least one cell, an indication of a channel change timing for a second cell of the spectrum sharing network.

20. The apparatus of claim 17, further comprising:
means for providing an indication of a target cell to which a wireless device served by the at least one cell is to be handed over.

21. The apparatus of claim 20, further comprising:
means for providing an indication of the frequency channel of the target cell.

22. The apparatus of claim 17, further comprising:
means for providing, by the coordinating device, for at least one user equipment (UE) served by a cell of the identified plurality of cells, a handover indication for the UE to transition to a different cell of the identified plurality of cells, the handover indication determined based at least in part on the order determined in response to receiving the indication that the frequency channel is to be vacated.

23. A non-transitory computer-readable medium storing code for wireless communication at a coordinating device of a spectrum sharing network, the code comprising instructions executable to:

receive, at the coordinating device, an indication that a frequency channel is to be vacated;

identify, at the coordinating device, a plurality of cells of the spectrum sharing network that are using the frequency channel and are to vacate the frequency channel based at least in part on the received indication;

determine, at the coordinating device, in response to receiving the indication that the frequency channel is to be vacated, an order in which the identified plurality of cells that are using the frequency channel are to change channels to vacate the frequency channel, wherein the order is determined based at least in part on a number of user devices associated with one or more cells of the plurality of cells, or a radio condition associated with the one or more cells, or a type of service for user devices associated with the one or more cells, or a combination thereof; and provide, by the coordinating device, to at least one cell of the identified plurality of cells, an indication of a channel change timing that is based at least in part on the order determined in response to receiving the indication that the frequency channel is to be vacated.

24. The non-transitory computer-readable medium of claim 23, wherein the instructions are executable to:
provide, to a first cell of the at least one cell, an indication of a different frequency channel for the first cell to change to.

25. The non-transitory computer-readable medium of claim 23, wherein the instructions are executable to:
provide, to a first cell of the at least one cell, an indication of a channel change timing for a second cell of the spectrum sharing network.

26. The non-transitory computer-readable medium of claim 23, wherein the instructions are executable to:
provide an indication of a target cell to which a wireless device served by the at least one cell is to be handed over.

27. The non-transitory computer-readable medium of claim 26, wherein the instructions are executable to:
provide an indication of the frequency channel of the target cell.

28. The non-transitory computer-readable medium of claim 23, wherein the instructions are executable to:
provide, by the coordinating device, for at least one user equipment (UE) served by a cell of the identified plurality of cells, a handover indication for the UE to transition to a different cell of the identified plurality of cells, the handover indication determined based at least in part on the order determined in response to receiving the indication that the frequency channel is to be vacated.

* * * * *